US011080632B2

(12) United States Patent
Gibbs et al.

(10) Patent No.: US 11,080,632 B2
(45) Date of Patent: Aug. 3, 2021

(54) OPTIMIZATION OF STEADY STATE COST FOR MULTI-SITE HIGH AVAILABILITY APPLICATION DEPLOYMENT OF MANAGEMENT AND MANAGED INTRASTRUCTURE

(71) Applicant: INTERNATIONAL BUSINESS MACHINES CORPORATION, Armonk, NY (US)

(72) Inventors: Nathaniel J. Gibbs, Iowa City, IA (US); Matthew M. Lobbes, Northlake, TX (US); Shelbee D. Smith-Eigenbrode, Thornton, CO (US); Brian J. Snitzer, Lancaster, PA (US)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 15/363,277

(22) Filed: Nov. 29, 2016

(65) Prior Publication Data

US 2018/0150780 A1      May 31, 2018

(51) Int. Cl.
*G06Q 10/06* (2012.01)
(52) U.S. Cl.
CPC ..... *G06Q 10/06315* (2013.01); *G06Q 10/067* (2013.01)
(58) Field of Classification Search
CPC ........ G06Q 10/00; G06Q 30/02; G06Q 10/06; G06Q 10/06315; G06Q 10/067
USPC .............................................. 705/7.11–7.42
See application file for complete search history.

(56) References Cited

U.S. PATENT DOCUMENTS

| 8,370,490 | B2 | 2/2013 | Deng et al. | |
| 9,043,658 | B1* | 5/2015 | Marr | G06F 12/14 |
| | | | | 702/182 |
| 9,207,993 | B2 | 12/2015 | Jain | |
| 2009/0276771 | A1* | 11/2009 | Nickolov | G06F 9/4856 |
| | | | | 717/177 |
| 2010/0058347 | A1* | 3/2010 | Smith | G06F 9/50 |
| | | | | 718/104 |
| 2010/0211669 | A1* | 8/2010 | Dalgas | G06F 9/5027 |
| | | | | 709/224 |
| 2011/0282982 | A1* | 11/2011 | Jain | G06F 9/5094 |
| | | | | 709/223 |
| 2011/0296249 | A1* | 12/2011 | Merchant | G06F 11/3428 |
| | | | | 714/42 |

(Continued)

OTHER PUBLICATIONS

Lama et al., Autonomic Performance and Power Control for Co-Located Web Application in Virtualized Datacenters, Apr. 22, 2016 IEEE Transaction on Parallel and Distributed Systems, vol. 27, Issue 5 pp. 1289-1302 (Year: 2016).*

*Primary Examiner* — Robert D Rines
(74) *Attorney, Agent, or Firm* — Schmeiser, Olsen & Watts, LLP; Christopher Pignato

(57) ABSTRACT

A method and system. The method includes receiving datacenter context input information, processing the datacenter context input information, and outputting the cost-versus-datacenter-quantity information. The processing the datacenter context input information may generate the cost-versus-datacenter-quantity information. The cost-versus-datacenter-quantity information is a total datacenter cost to run an application versus a quantity of datacenters used to run the application.

8 Claims, 11 Drawing Sheets

(56) References Cited

U.S. PATENT DOCUMENTS

| | | | |
|---|---|---|---|
| 2012/0136697 A1* | 5/2012 | Peles | G06Q 10/0639 705/7.38 |
| 2015/0134723 A1* | 5/2015 | Kansal | H04L 67/1031 709/203 |
| 2016/0087909 A1 | 3/2016 | Chatterjee et al. | |

* cited by examiner

OPTIMIZATION OF STEADY STATE COST FOR MULTI-SITE HIGH AVAILABILITY APPLICATION DEPLOYMENT OF MANAGEMENT AND MANAGED INTRASTRUCTURE

TECHNICAL FIELD

The present invention relates to determining the most cost effective number of datacenters to run an application.

BACKGROUND

Datacenter systems may be relatively large offsite storage/computing/communication resources which service users on a network. Software application (e.g. YouTube or Netflix servers) may run in parallel over multiple datacenters to satisfy high volume user demands. Provisioning of datacenters to run an application may have unpredictable variables which may make it difficult to determine the most cost effective number of datacenters to run an application. For large applications, costs of running the application on a datacenter network may be price sensitive. There is a long felt, but thus far unfulfilled, need for techniques to determine the most cost effective number of datacenters to run an application.

SUMMARY

Embodiments of the present invention relate to a method, and associated computer system and computer program product. The method includes receiving datacenter context input information, processing the datacenter context input information, and outputting the cost-versus-datacenter-quantity information. The processing the datacenter context input information generates the cost-versus-datacenter-quantity information. The cost-versus-datacenter-quantity information is a total datacenter cost to run an application versus a quantity of datacenters used to run the application.

DETAILED DESCRIPTION

Figure 1:
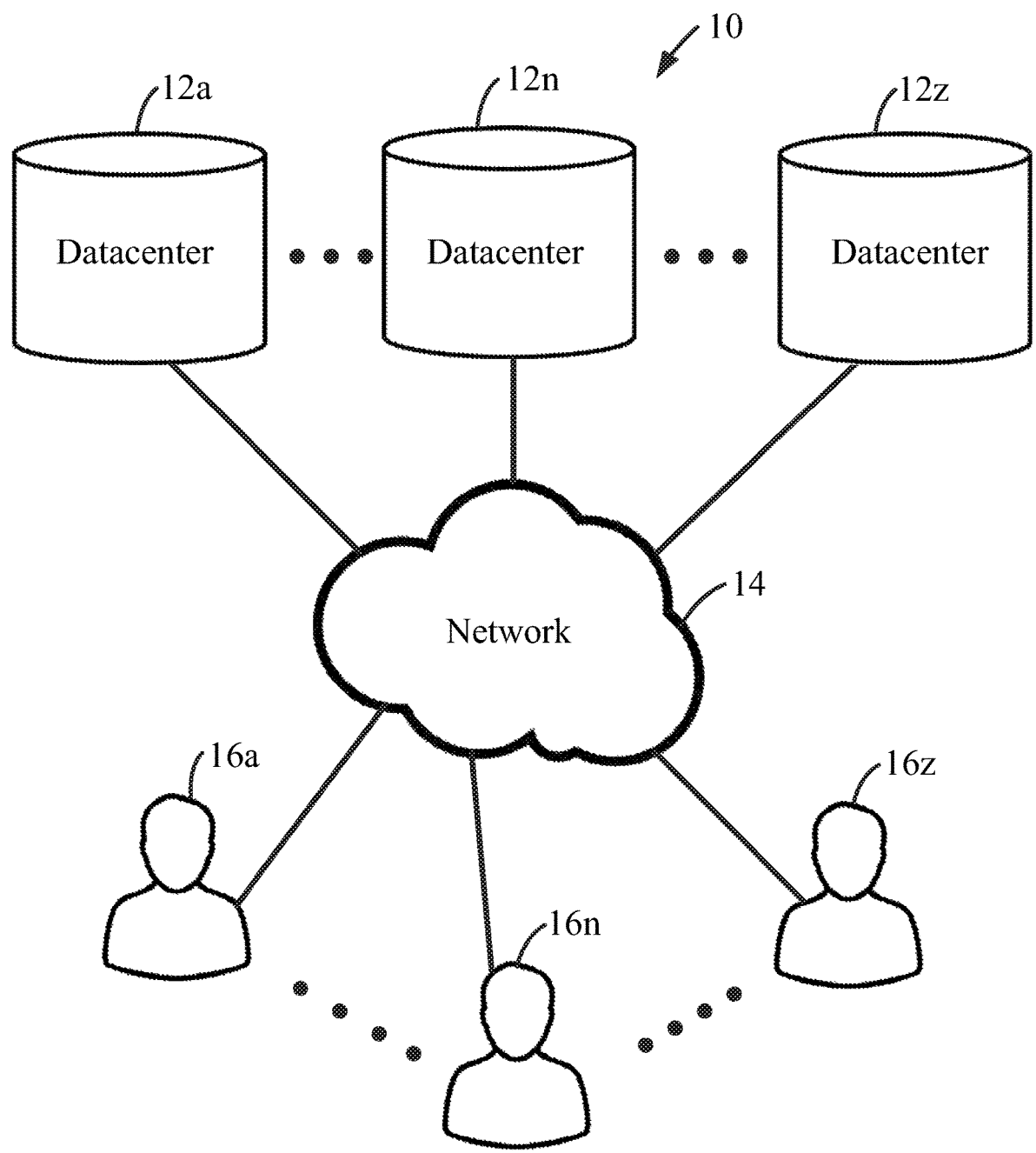
FIG. 1 illustrates example datacenters servicing users, in accordance with embodiments of the present invention.

FIG. 1 illustrates example datacenters $12a$-$12z$ servicing users $16a$-$16z$, in accordance with embodiments of the present invention. Datacenters $12a$-$12z$ are facilities used to house computer systems and associated components. Datacenters $12a$-$12z$ may have relatively substantial storage, communication, and/or computing capacity. Datacenters $12a$-$12z$ may have broad applications in fields such as telecommunications, storage systems, website hosting, and/or any other non-local computing applications. Resources of datacenters $12a$-$12z$ may be accessible to users $16a$-$16z$ through network 14. Datacenters $12a$-$12z$ may run a plurality of different applications that share each datacenter's computational, storage, and communication resources. Datacenters $12a$-$12z$ may include redundant power supplies, redundant data communications connections, environmental controls (e.g. air conditioning, fire suppression, etc.), various security systems, and other industrial scale features to facilitate a mass computing environment. Large data centers are industrial scale operations that use a significant amount of electricity.

In embodiments, datacenters $12a$-$12z$ may be used for cloud computing services. Cloud computing is a type of internet based computing that provides shared computer processing resources and data to computers and other devices on demand. It is a model for enabling ubiquitous, on-demand access to a shared pool of configurable computing resources (e.g. computer networks, servers, storage, applications and services), which can be rapidly provisioned and released with minimal management effort. Cloud computing and storage solutions provide users and enterprises with various capabilities to store and process their data in third-party data centers that may be located far from the user. Cloud computing relies on sharing of resources to achieve coherence and economy of scale.

In embodiments, a software application may be run on a datacenter system 10. The software application may run on datacenters $12a$-$12z$ to services a plurality of users $16a$-$16z$. The plurality of users $16a$-$16z$ may access the application run on the datacenters $12a$-$12z$ through network 14. In embodiments, network 14 may be the internet. In embodiments, network 14 may be an intranet network or any other kind of network that connects computing devices.

The number of the plurality of users $16a$-$16z$ may be relatively large, potentially in the hundreds or thousands or millions or billions of users worldwide. For simplicity of illustration, only users $16a$, $16n$, and $16z$ are illustrated, but those skilled in the art appreciate that an application run on a plurality of datacenters $12a$-$12z$ may service any number of users. Since the servicing of a substantial number of users requires a relatively large amount of computing power, communications capacity, and other resources for users whom may be spreadout over the world, an application run on datacenter system 10 may be redundantly run over the plurality of datacenters $12a$-$12z$. Although a plurality of datacenters $12a$-$12z$ may run the same application in parallel, different users may utilize different datacenters (e.g. user $16a$ may utilize datacenter $12a$ while user $16z$ may utilize datacenter 12z). The number of datacenters 12a-12z which should be provisioned to run the applications is a relatively complex determination based on datacenter logistics, component costs, expected demand, customer risk tolerance, estimations, varying costs, and other factors.

For example, if the application is for a video streaming service (e.g. YouTube or Netflix) that provides service to millions or billions of people around a nation or the world, the application would be spread out over a relatively large number of datacenters (e.g. hundreds or thousands of datacenters). As a comparative example, if the application is a local newspaper's website servicing only several hundreds of occasional users in a locality, the application would be spread out over a relatively small number of datacenters (e.g. as low as two or three datacenters).

Datacenters are relatively large facilities prone to service interruption due to telecommunication failures, power failures, and/or other complications. Since there is always the chance that one or more datacenters of the plurality of datacenters 12a-12z will unexpectedly go offline, an application may be redundantly running on the plurality of datacenters 12a-12z. If an application is running redundantly and if one or more datacenters of the plurality of datacenters 12a-12z unexpectedly goes offline, then the other datacenter that stayed online will continue to run an application without service disruption noticed by the users 16a-16z.

Service disruptions may not be noticed by users 16a-16z when one or more datacenters of the plurality of datacenters 12a-12z go offline if the application is provisioned over the plurality of datacenters 12a-12z with overcapacity. For example, the number of datacenters which may be used to run an application may be chosen such that if one datacenter of the plurality of datacenters 12a-12z goes unexpectedly offline, even with that reduction in capacity from the datacenter going offline, all of the demands of a plurality of users 16a-16z will be satisfied by the datacenters which stayed online.

For example, a relatively small application (e.g. a local newspaper website) may provision two datacenters with each having the capacity to meet all of the user demands if one of the two datacenters unexpectedly goes offline. In this example, each datacenter of the two datacenters will need to have 100% capacity of the total expected user demands, since if one of the two datacenters goes unexpectedly offline, the other datacenter needs the full 100% handle the workload by itself.

As another example, a relatively small application may provision three datacenters with capacities to meet all of the user demands if one of the three datacenters unexpectedly goes offline. In this example, each of the three datacenters will need to have 50% capacity of the total expected user demands, since if one of the three datacenters goes unexpectedly offline, then the other two datacenters can handle the workload (i.e. each of the two remaining data centers will perform 50% of the workload while the third datacenter is offline). Likewise, if four datacenters are provisioned, then each of the four datacenters will need to have 33.3% capacity of the total expected user demands, since if one of the four datacenters goes unexpectedly offline, then the other three datacenters can handle the workload (i.e. each of the three remaining data centers will perform 33.3% of the workload while the fourth datacenter is offline).

For relatively large applications (e.g. YouTube or Netflix), hundreds or thousands of datacenters may be provisioned in a manner that insures uninterrupted service to users even if multiple datacenters unexpectedly go offline. For example, if an application provisions 110 (one hundred ten) datacenters with the capability to meet anticipated user demands if ten of those datacenters goes offline, then each of the 110 datacenters would need to have only 1% capacity of the total expected user demands. From this illustrative example, the more datacenters for which an application can be provisioned, the less redundancy that is required. In the extreme redundancy example of two datacenters, each of the two datacenter must be able to handle 100% of the expected user demands, while the provisioning of 110 datacenters (with tolerance of 10 datacenters being offline) only needs to handle 1% of the expected user demands. The more datacenters which are provisioned, the less resources that need to be allocated to redundancy, which can have cost savings benefits. However, the more datacenters which are provisioned, there are increased overall costs for the management of multiple virtual machine groups spread out over the plurality of datacenters 12a through 12z.

Due to pragmatic limitations to the provisioning of an application over a plurality of datacenters 12a-12z, it is not a straightforward decision to decide how many datacenters to provision when running specific applications. Customers may have different risk tolerances for the risk of an application failure due to datacenters going offline. Costs to run components of a datacenter may need to be estimated, since the costs of running the datacenter components may be unpredictable and/or variable. Customers may have confidence factors in their estimates of the costs to run a datacenter, which may complicate determining optimal cost-versus-datacenter-quantity information. Historical accuracy of the prediction of costs may or may not be available. Datacenters may logistically be limited to discrete numbers of virtual machines and virtual machine groups.

In embodiments, cost-versus-datacenter-quantity information may include a determination of the most cost effective number of datacenters that should be provisioned based on the datacenter context input information received from a user. In embodiments, cost-versus-datacenter-quantity information may be in the form of a display graph (e.g. FIG. 5) which indicates the determined most cost effective number of datacenters. In embodiments, cost-versus-datacenter-quantity information may be any means of outputting and/or communicating the most cost effective number of datacenters to provision based on received datacenter context input information.

In embodiments, different customers having their applications run on a datacenter network may have different risk tolerances. For example, an airline having a medium size website application that services their customers (e.g. users 16a-16z) may have a relatively low risk tolerance, since an airline's business reputation may be damaged if their website fails to connect to users during peak travel time. Accordingly, an airline may provision a plurality of datacenters 12a-12z such that a relatively large number of datacenters can go offline and all user demand can be met with the datacenters that stayed online. For example, an airline may provision 110 (one hundred ten) datacenters with a risk tolerance that ten of those 110 datacenters can go offline and the airline can still meet all of their customer's demands to access their website. This means that even if ten datacenters go unexpectedly offline, then there are 100 (one hundred) datacenters left online, which cumulatively have enough capacity to satisfy the airline's anticipated user demands (e.g. 100 datacenters remaining online is enough datacenters for the airline's website to handle anticipated website traffic levels).

For hypothetical purposes of explanation, an airline's website may be a medium size application running in parallel on the plurality of datacenters 12a-12z. An airline's website may be used by tens of thousands of customers (i.e. users) per day depending on the airline's business patterns. In contrast, a relatively large application may be a streaming video service (e.g. YouTube, Netflix, etc.) that services millions or billions of users 16a-16z on a daily basis. As yet a opposite contrasting example, a relatively small application may be a local newspaper that services only hundreds of users everyday but runs their relatively small application over the plurality of datacenters 12a-12z to ensure redundancy in the event that one datacenter fails.

Costs to run components of a datacenter may often need to be estimated. When datacenter customers purchase or otherwise acquire resources of the plurality of data centers 12a through 12z, these customers or the datacenter operators may need to estimate many of the costs. The components in the datacenter include variable electric power costs, unpredictability of user traffic, unpredictability of computational demands by users, unpredictability of hardware costs, and other variables that effect a final cost of running an application on a datacenter platform. However, during provisioning, customers may estimate the costs of these components in order to choose a desirable provisioning configuration for their application. Different customers and/or different applications may have different tolerances for the accuracy of cost estimations. Customers may have different confidence factors in their estimates of the volume, configuration, and costs of different components of the plurality of datacenters 12a-12z needed to run an application.

Historical accuracy of the prediction of costs may or may not be available. If there is a history of the costs of components of datacenters 12a-12z, then historical information may be used to estimate costs. Historical information of datacenter component costs may be a relatively accurate estimation of costs. In some circumstances, historical information of datacenter component costs may be less dependable (e.g. if there is high variance in those costs).

Datacenters may logistically be limited to discrete numbers of virtual machines and virtual machine groups. Datacenters may include a plurality of virtual machines. In computing, a virtual machine (VM) is an emulation of a computer system. Virtual machines are based on computer architectures and provide functionality of a physical computer. Their implementations may involve specialized hardware, software, and/or a combination thereof.

Figure 2:
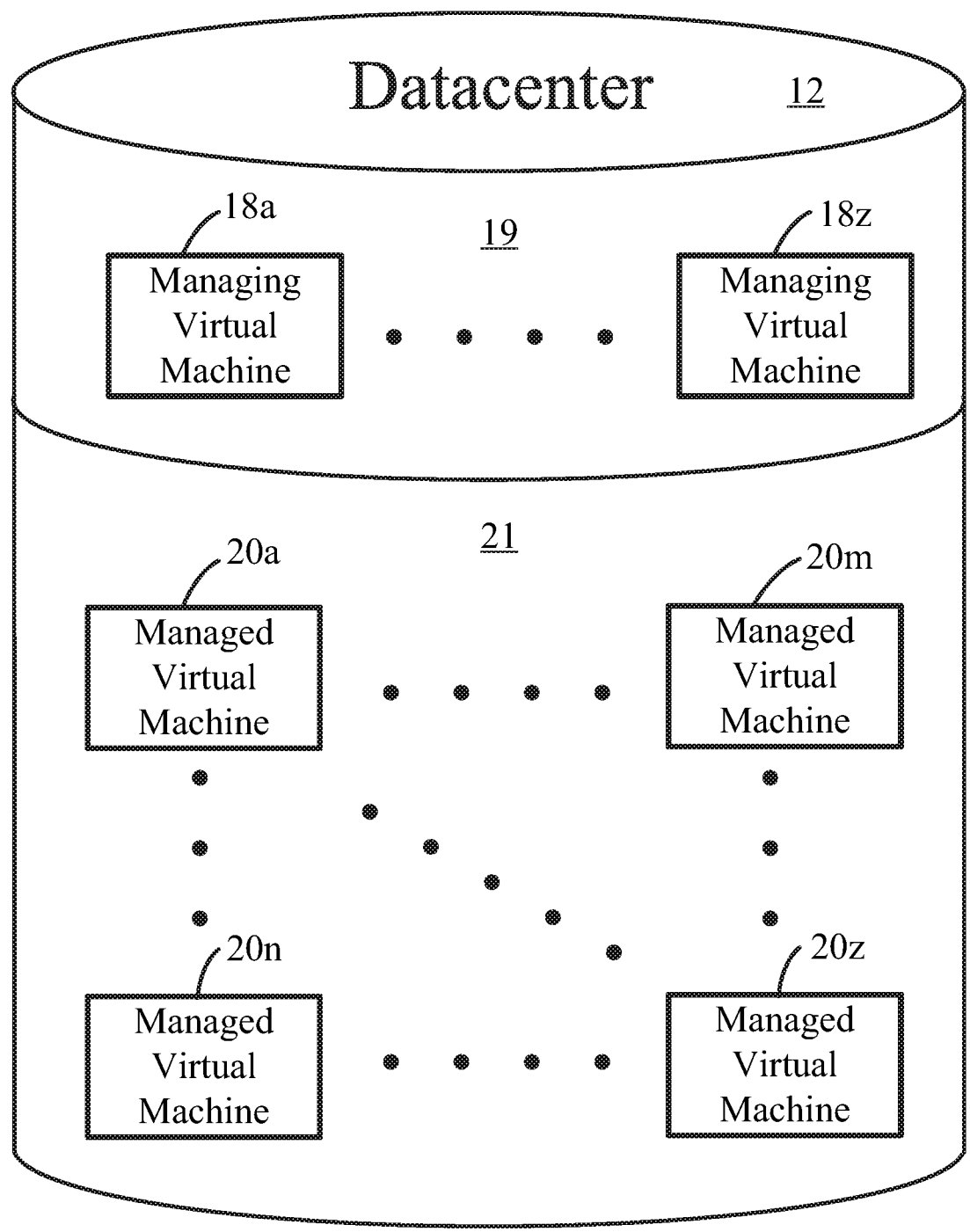
FIG. 2 illustrates an example datacenter with both managing virtual machines and managed virtual machines, in accordance with embodiments of the present invention.

FIG. 2 illustrates an example datacenter 12 with both managing virtual machines 18a-18z and managed virtual machines 20a-20z, in accordance with embodiments of the present invention. One category of virtual machines are managed virtual machines 20a-20z using managed virtual machine resources 21 of datacenter 12. Another category of virtual machines are managing virtual machines 18a-18z using managing virtual machine resources 19 of datacenter 12. Managed virtual machines 20a-20z may perform workload tasks of running an application, while managing virtual machines 18a-18z may manage the managed virtual machines 20a-20z.

Figure 3:
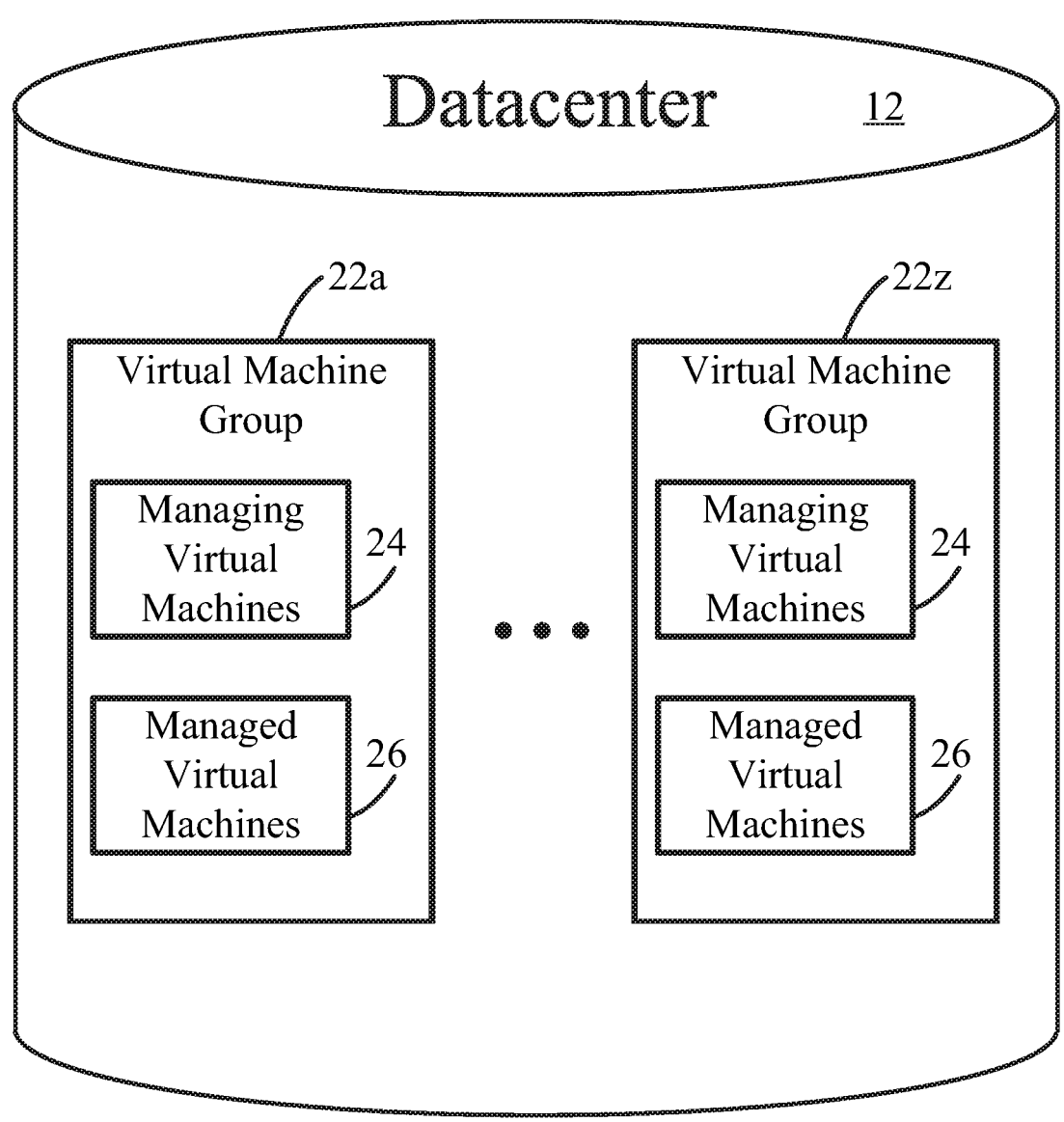
FIG. 3 illustrates an example datacenter having multiple virtual machine groups, in accordance with embodiments of the present invention.

FIG. 3 illustrates an example datacenter 12 having multiple virtual machine groups 22a-22z, in accordance with embodiments of the present invention. Managing virtual machines 24 and managed virtual machines 26 may be included in virtual machine groups 22a-22z. Each of virtual machine groups 22a-22z may include predetermined numbers of both managing virtual machines 18a-18z and managed virtual machines 20a-20z. Depending on provisioning requirements of an application, different applications may have different ratios and volumes of managing virtual machines 24 and managed virtual machines 26 in the virtual machine groups 22a-22z, which when balanced with other variables may affect the determination of an optimal number of datacenters 12a-12z to be implemented in running an application.

Figure 4:
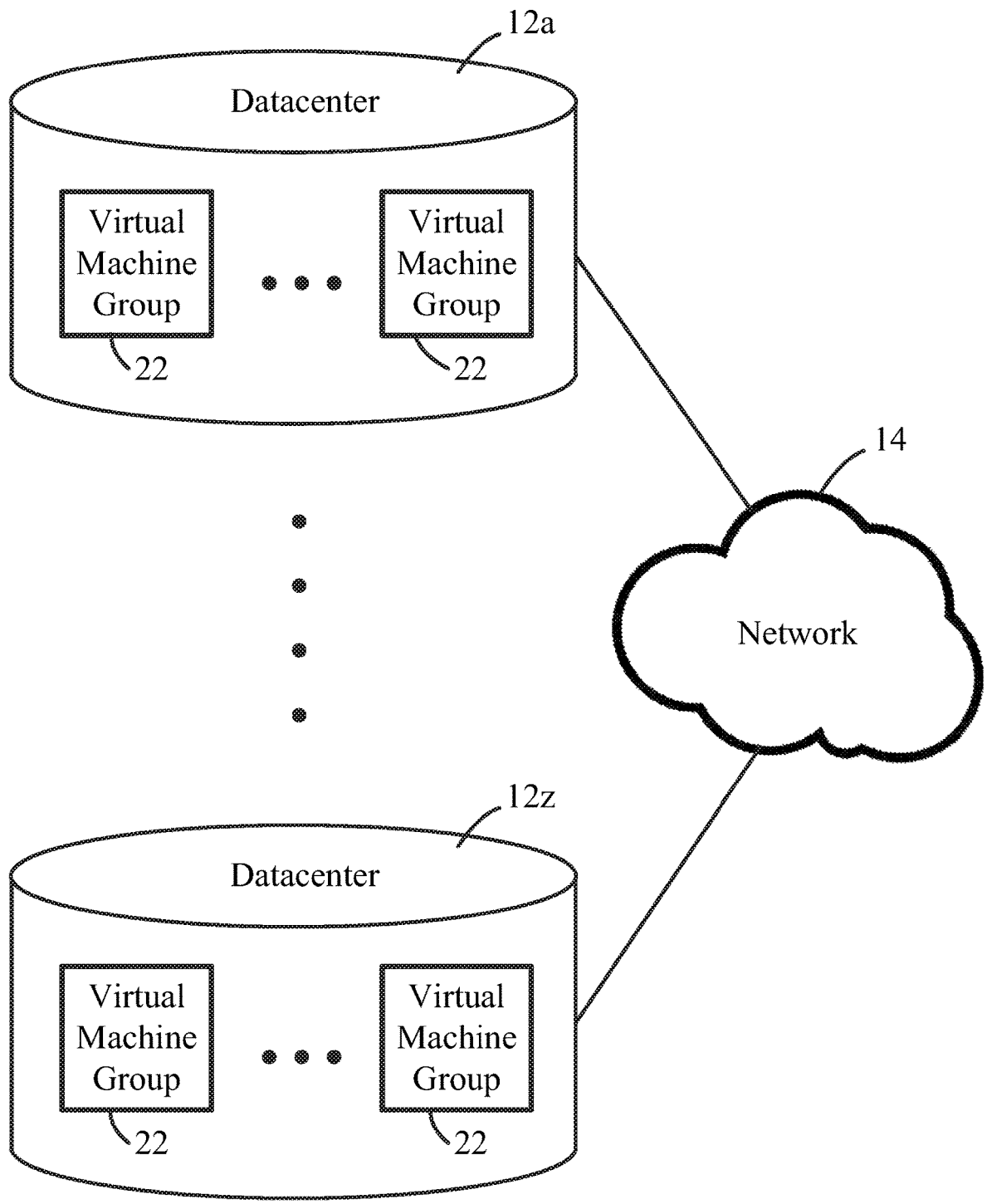
FIG. 4 illustrates an example distribution of virtual machine groups among a plurality of datacenters, in accordance with embodiments of the present invention.

FIG. 4 illustrates an example distribution of virtual machine groups 22 among a plurality of datacenters 12a-12z on network 14, in accordance with embodiments of the present invention. An application run by a customer on the plurality of datacenters 12a-12z may be spread out over the plurality of datacenters 12a-12z for many different reasons. For example, the application may be run for users whom are geographically dispersed (e.g. customers of an airline). Datacenter 12a may service users in one geographic region (e.g. New York City area) while datacenter 12z may service users in another geographic region (e.g. Los Angeles area).

As another example, an application may be run spread out over the plurality of datacenters 12a-12z for redundancy and/or quality of service. Each of datacenters 12a-12z may be essentially running a plurality of duplicates of an application in parallel. Accordingly, one or more of datacenters 12a-12z could go offline, but due to overcapacity/redundancy of the datacenters 12a-12z that remained online there may be no service interruptions visible to the users. In other words, through the use of the plurality of datacenters 12a-12z, quality of service of applications to users can be assured (e.g. based on usage predictions made at the time of provisioning). For example, if datacenter 12a went offline and datacenters 12b-12z remained online, through redundancy and/or overcapacity over the plurality of datacenters 12a-12z, the remaining online datacenters 12b-12z can satisfy the predicted user demands for the application, thus satisfying quality of service expectations in running the application.

Figure 5:
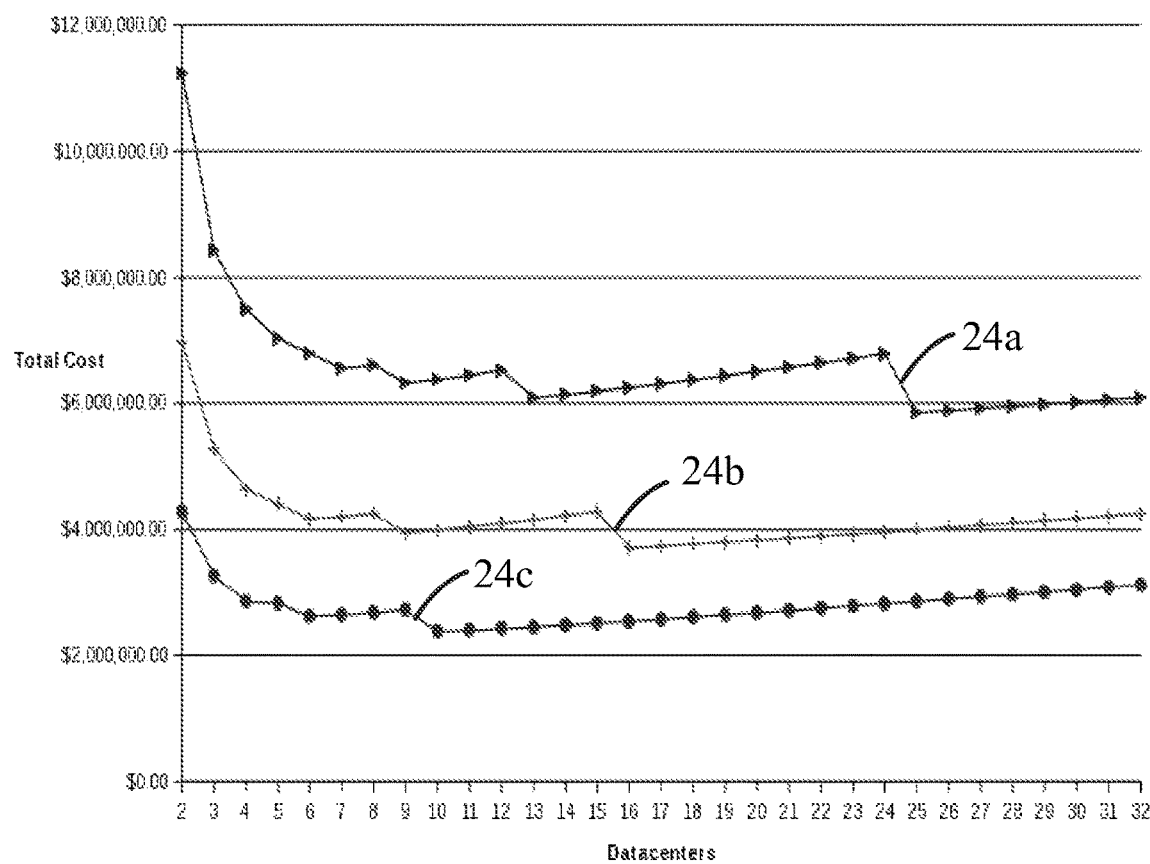
FIG. 5 illustrates example graph of cost-versus-datacenter-quantity information, in accordance with embodiments of the present invention.

FIG. 5 illustrates a hypothetical graph of cost-versus-datacenter-quantity information, in accordance with embodiments of the present invention. For the purposes of simplicity and illustration, the graph of FIG. 5 includes hypothetical cost-versus-datacenter-quantity information 24a for an application that requires 23,300 managed virtual machines, as shown in Table 1.

TABLE 1

| Datacenter Input Context Information | Variable Symbol | Variable Name | Estimated Value |
|---|---|---|---|
| Total Managed VM Capacity Needed | α | Alpha | 23,300 |
| Cost per Managed VM | Ω | Omega | $200 |
| Number of Datacenters | ξ | Xi | |
| Offline Failure Tolerance | Δ | Delta | 1 |
| Number of Datacenters Required to Stay Online | ξ − Δ | | |
| Number of Managed VMs in a VM Group | λ | Lambda | 1000 |
| Number of Managing VMs in a VM Group | φ | Phi | 100 |
| Cost per Managing VM | μ | Mu | $400 |

In embodiments, a parameters for the total number of managed virtual machines may be represented by the symbol α (alpha). FIG. 5 illustrates cost-versus-datacenter-quantity information 24a hypothetically reelecting an estimate that the total number of managed virtual machines (α) is 23,300.

In embodiments, a parameter for the cost for each of the managed virtual machines may be represented by the symbol Ω (omega). FIG. 5 illustrates cost-versus-datacenterquantity information 24a, 24b, and 24c hypothetically estimates that the unit cost for each managed virtual machine Ω is $200.

In embodiments, a parameter for the number of datacenters may be represented by the symbol ξ (xi). The number of datacenters (ξ) may be a variable by the cost-versus-datacenter-quantity information 24a, 24b, and 24c for 23,300 managed virtual machines, 14,400 managed virtual machines, and 8,900 managed virtual machines respectively. For example, in cost-versus-datacenter-quantity information 24a, the total cost of having 25 (twenty five) datacenters may go down to $5,854,167 from $6,782,609 from when 24 (twenty four) datacenters are used for 23,300 managed virtual machines. This reduction in costs when the number of datacenters increases may be due to discrete logistical divisions of preset numbers of managing virtual machines (φ) and managed virtual machines (α) in each virtual machine group 22. Aside from cost inflection points, the cost-versus-datacenter-quantity information may have an overall upward trend. As can be observed from inflection points in cost-versus-datacenter-quantity information 24a, 24b, and 24c, the greater the number of managing virtual machines required, the greater the significant of the inflection points representing total cost savings when the number of datacenters is increased over a trough threshold.

In embodiments, a parameter for offline tolerance may be represented by the symbol Δ (delta). Based on customer requirements, the number of datacenters that can go offline (Δ) while maintaining the anticipated total capacity in the remaining online datacenters may be a preset tolerance parameter Δ which can be set by a customer acquiring datacenter capacity as part of the datacenter context input information input by the customer. In the hypothetical datacenter context input information 24a, the tolerance parameter Δ may be equal to 1 (one), meaning that one datacenter can go offline and the remaining online datacenters maintain provisioned service quality requirements (e.g. user demands can be met even if one datacenter goes offline). In embodiments, datacenter context information may specify any discrete value for tolerance parameter Δ to set expected service quality requirements.

In embodiments, a parameter for the number of managed virtual machines in a virtual machine group may be represented by the symbol λ (lambda). Based on application demands and/or customer requirements, the number of managed virtual machines in a virtual machine group 22 (λ) may affect the cost-versus-datacenter-quantity information.

In embodiments, a parameter for the number of managing virtual machines in a virtual machine group may be represented by the symbol φ (phi). Based on application demands and/or customer requirements, the number of managing virtual machines in a virtual machine group 22 (φ) may affect the cost-versus-datacenter-quantity information.

In embodiments, a parameter for the cost for each of the managed virtual machines may be represented by the symbol μ (mu). FIG. 5 illustrates cost-versus-datacenter-quantity information 24a, 24b, and 24c hypothetically estimating that the unit cost for each managing virtual machine μ is $400.

Figure 6:
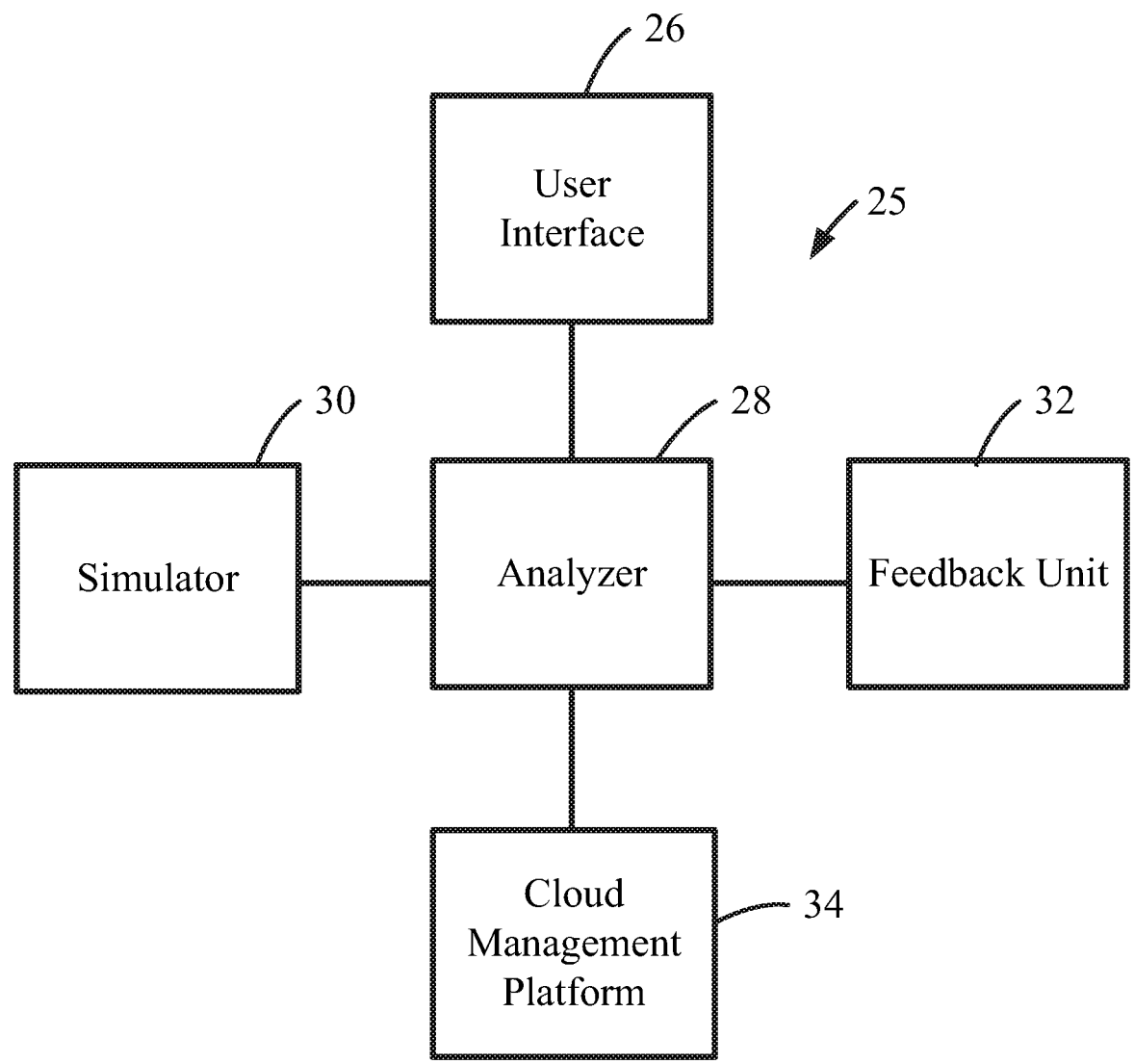
FIG. 6 illustrates a system that generates cost-versus-datacenter-quantity information, in accordance with embodiments of the present invention.

FIG. 6 illustrates system 25 that generates cost-versus-datacenter-quantity information, in accordance with embodiments of the present invention. System 25 may include user interface 26 which cumulates, compiles, and/or otherwise generates datacenter context input information in response to a user input and/or importation of user requirements. User interface 26 outputs the datacenter context input information to analyzer 28. Analyzer 28 may received datacenter context input information from user interface 26 to generate cost-versus-datacenter-quantity information from received datacenter context input information. Generated cost-versus-datacenter-quantity information may be output from analyzer 28 to user interface 26, to a cloud management platform 34, and/or to another relevant output path appreciated by those skilled in the art. In embodiments, analyzer 28 may generate cost-versus-datacenter-quantity information based on calculations on datacenter context input information. In embodiments, datacenter context input information may include estimates of parameters of the datacenter context input information with different confidence factors on the accuracy of these estimated parameters. In embodiments, estimates of parameters and their confidence factors may be statistically simulated in simulator 30 to generate cost-versus-datacenter-quantity information. In embodiments, datacenter context input information may be supplemented and/or replaced with historically accurate parameters input from feedback unit 32.

Analyzer 28 may interface with simulator 30, in accordance with embodiments. In embodiments, simulator 30 may statistically simulate refinements to datacenter context input information using confidence factor parameters (e.g. $\alpha_{cf}$, $\Omega_{cf}$, $\lambda_{cf}$, $\varphi_{cf}$, and/or $\mu_{cf}$). Confidence factor parameters may be directly or indirectly associated with parameters of datacenter context input information (e.g. α, Ω, λ, φ, and/or μ) and may be used to determine the most cost effective number of datacenters.

For example, a confidence factor parameter $\alpha_{cf}$ for the parameter α may represent a degree of confidence in a user estimation of the total quantity of managed virtual machines required to run an application, in accordance with embodiments. For example, a confidence factor parameter $\Omega_{cf}$ for the parameter Ω may represent a degree of confidence in a user estimation of the cost of each of the managed virtual machines, in accordance with embodiments. For example, a confidence factor parameter $\lambda_{cf}$ for the parameter λ may represent a degree of confidence in a user estimation of the number of managed virtual machines that are managed by each virtual machine group, in accordance with embodiments. For example, a confidence factor parameter $\varphi_{cf}$ for the parameter φ may represent a degree of confidence in a user estimation of the number of managing virtual machines in the virtual machine group, in accordance with embodiments. For example, a confidence factor parameter $\mu_{cf}$ for the parameter μ may represent a degree of confidence in a user estimation of the cost of each managing virtual machine, in accordance with embodiments.

For the purposes of simplicity and illustration, the following table is a hypothetical association of confidence factors (e.g. $\alpha_{cf}$, $\Omega_{cf}$, $\lambda_{cf}$, $\varphi_{cf}$, and/or $\mu_{cf}$) for associated hypothetical parameters of datacenter input context information (e.g. α, Ω, λ, φ, and/or μ) for an application that hypothetically requires 23,300 managed virtual machines, as shown in Table 2.

TABLE 2

| Datacenter Input Context Information | Variable Symbol | Variable Name | Estimated Value | Confidence Factor | Statistical Distribution Type |
|---|---|---|---|---|---|
| Total Managed VM Capacity Needed | $\alpha$ | Alpha | 23,300 | $\alpha_{cf} = 80\%$ | Beta |
| Cost per Managed VM | $\Omega$ | Omega | $200 | $\Omega_{cf} = 80\%$ | Normal |
| Number of Datacenters | $\xi$ | Xi | | | |
| Offline Failure Tolerance | $\Delta$ | Delta | 1 | | |
| Number of Datacenters Required to Stay Online | $\xi - \Delta$ | | | | |
| Number of Managed VMs in a VM Group | $\lambda$ | Lambda | 1000 | $\lambda_{cf} = 100\%$ | Discrete Uniform |
| Number of Managing VMs in a VM Group | $\varphi$ | Phi | 100 | $\varphi_{cf} = 80\%$ | Poisson |
| Cost per Managing VM | $\mu$ | Mu | $400 | $\mu_{cf} = 80\%$ | Uniform |

In this hypothetical example, a user may estimate that an application needs a total of 23,300 managed virtual machines (e.g. $\alpha$=23,300) with 80% confidence that this estimate is accurate (e.g. $\alpha_{cf}$=80%). In embodiments, a confidence factor $\alpha_{cf}$ may have a statistical beta distribution. Accordingly, simulator 30 may simulate different values of the total number of virtual machines based on a beta distribution to modify and/or supplement the datacenter input context information to contribute to the analyzer 28 generating cost-versus-datacenter-quantity information. Confidence factor $\alpha_{cf}$ may be simulated by simulator 30 by other types of statistical distributions aside from beta distributions (e.g. a discrete uniform distribution, a Poisson distribution, a binomial distribution, a geometric distribution, a hypergeometric distribution, a uniform distribution, a normal distribution, an exponential distribution, a gamma distribution, and/or a Weibull distribution).

In this hypothetical example, a user may estimate a cost of each managed virtual machines as $200 (e.g. $\Omega$=$200) with 80% confidence that this estimate is accurate (e.g. $\Omega_{cf}$=80%). In embodiments, a confidence factor $\Omega_{cf}$ may have a statistical normal distribution. Accordingly, simulator 30 may simulate different costs of each managed virtual machine based on a normal statistical distribution to modify and/or supplement the datacenter input context information to contribute to the analyzer 28 generating cost-versus-datacenter-quantity information. Confidence factor $\Omega_{cf}$ may be simulated by simulator 30 by other types of statistical distributions aside from normal distributions (e.g. a discrete uniform distribution, a Poisson distribution, a binomial distribution, a geometric distribution, a hypergeometric distribution, a uniform distribution, an exponential distribution, a beta distribution, a gamma distribution, and/or a Weibull distribution).

In this hypothetical example, a user may estimate the number of managed virtual machines in a virtual machine group to be 1000 (e.g. $\lambda$=1000) with 100% confidence that this estimate is accurate (e.g. $\lambda_{cf}$=100%). In embodiments, where a confidence factor is 100%, then simulator 30 may not conduct any statistical analysis since the estimated value with 100% confidence can be directly used to generate the cost-versus-datacenter-quantity information. In embodiments, a confidence factor $\lambda_{cf}$ may have a statistical discrete uniform distribution, when confidence factor $\lambda_{cf}$ is below 100%. Accordingly, simulator 30 may simulate different values of the number of managed virtual machines in a virtual machine group based on a discrete uniform distribution to modify and/or supplement the datacenter input context information to contribute to the analyzer 28 generating cost-versus-datacenter-quantity information. Confidence factor $\lambda_{cf}$ may be simulated by simulator 30 by other types of statistical distributions aside from discrete normal distributions (e.g. a Poisson distribution, a binomial distribution, a geometric distribution, a hypergeometric distribution, a uniform distribution, a normal distribution, an exponential distribution, a beta distribution, a gamma distribution, and/or a Weibull distribution).

In this hypothetical example, a user may estimate the number of managing virtual machines in a virtual machine group to be 100 (e.g. $\varphi$=100) with 80% confidence that this estimate is accurate (e.g. $\varphi_{cf}$=80%). In embodiments, a confidence factor $\varphi_{cf}$ may have a statistical Poisson distribution. Accordingly, simulator 30 may simulate different values of the number of managing virtual machines in a virtual machine group based on a Poisson distribution to modify and/or supplement the datacenter input context information to contribute to the analyzer 28 generating cost-versus-datacenter-quantity information. Confidence factor $\varphi_{cf}$ may be simulated by simulator 30 by other types of statistical distributions aside from Poisson distributions (e.g. a discrete uniform distribution, a binomial distribution, a geometric distribution, a hypergeometric distribution, a uniform distribution, a normal distribution, an exponential distribution, a beta distribution, a gamma distribution, and/or a Weibull distribution).

In this hypothetical example, a user may estimate the cost of each managing virtual machine to be $400 (e.g. $\mu$=$400) with 80% confidence that this estimate is accurate (e.g. $\mu_{cf}$=80%). In embodiments, a confidence factor $\mu_{cf}$ may have a statistical uniform distribution. Accordingly, simulator 30 may simulate different values of the cost of each managing virtual machine based on a uniform distribution to modify and/or supplement the datacenter input context information to contribute to the analyzer 28 generating cost-versus-datacenter-quantity information. Confidence factor $\mu_{cf}$ may be simulated by simulator 30 by other types of statistical distributions aside from uniform distributions (e.g. a discrete uniform distribution, a Poisson distribution, a binomial distribution, a geometric distribution, a hypergeometric distribution, a normal distribution, an exponential distribution, a beta distribution, a gamma distribution, and/or a Weibull distribution).

In embodiments, simulator 30 may be a Monte Carlo simulator. Monte Carlo simulations are computational algorithms that rely on repeated random sampling to obtain numerical results. Monte Carlo simulators use randomness to solve computational problems. Monte Carlo simulations may be used in optimization calculations, numerical integration calculations, and/or generating draws from probability distributions. In embodiments, simulator 30 may perform computations on discrete uniform statistical distributions, Poisson statistical distributions, binomial statistical distributions, geometric statistical distributions, hypergeometric statistical distributions, uniform statistical distributions, normal statistical distributions, exponential statistical distributions, beta statistical distributions, gamma statistical distributions, Weibull statistical distributions, and/or any other statistical distribution appreciated by those skilled in the art.

In embodiments, users may select an appropriate range and distribution for each of the inputs (total capacity needed, cost per managed and managing VM, number of managing and managed VM's in a group), feed those distributions into a Monte Carlo simulator which may then run many "cases" with inputs selected from the distributions provided, and generate a range of simulated outcomes, allowing for analysis of "sweet spots" in the number datacenters into which to deploy and application vs total simulated cost.

Analyzer 28 may interface with feedback unit 32, in accordance with embodiments. In embodiments, feedback unit 32 may improve the accuracy of a user's estimates of parameters of the datacenter context input information with associated historically accurate parameters (e.g. $\alpha_a$, $\Omega_a$, $\lambda_a$, $\varphi_a$, and/or $\mu_a$). Historically accurate parameters may be directly or indirectly associated with parameters of datacenter context input information (e.g. $\alpha$, $\Omega$, $\lambda$, $\varphi$, and/or $\mu$) and may be used to determine the most cost effective number of datacenters.

For the purposes of simplicity and illustration, the following table is a hypothetical association of historically accurate parameters (e.g. $\alpha_a$, $\Omega_a$, $\lambda_a$, $\varphi_a$, and/or $\mu_a$) for associated hypothetical parameters of datacenter input context information (e.g. $\alpha$, $\Omega$, $\lambda$, $\varphi$, and/or $\mu$) for an application that hypothetically is estimated by a customer to require a total of 23,300 managed virtual machines, as shown in Table 3.

embodiments, a customer's estimate of parameter $\alpha$ may be substituted with historically accurate parameters $\alpha_a$ since historically accurate parameter $\alpha_a$ better correlates the total number of managed virtual machines which will be needed to run the application.

In this hypothetical example, a user may estimate a cost of each managed virtual machine as $200 (e.g. $\Omega$=$200). However, in accordance with embodiments, feedback unit 32 may provide historically accurate parameter $\Omega_a$ that is an actual cost of each managed virtual machine (e.g. $\Omega_a$=$195) needed for substantially similar applications that have been historically run on datacenter network 10. In embodiments, historically accurate parameter $\Omega_a$ may be substituted and/or otherwise supplement parameter $\Omega$ at analyzer 28. In other words, in embodiments, a customer's estimate of parameter $\Omega$ may be substituted with historically accurate parameters $\Omega_a$ since historically accurate parameter $\Omega_a$ better correlates the cost of each managed virtual machine which will be needed to run the application.

In this hypothetical example, a user may estimate the number of managed virtual machines in a virtual machine group as 1000 (e.g. $\lambda$=1000). However, in accordance with embodiments, feedback unit 32 may provide historically accurate parameter $\lambda_a$ that is an actual number of managed virtual machines in a virtual machine group as 1115 (e.g. $\lambda_a$=1115) needed for substantially similar applications that have been historically run on datacenter network 10. In embodiments, historically accurate parameter $\lambda_a$ may be substituted and/or otherwise supplement parameter $\lambda$ at analyzer 28. In other words, in embodiments, a customer's estimate of parameter $\lambda$ may be substituted with historically accurate parameters $\lambda_a$ since historically accurate parameter $\lambda_a$ better correlates to a number of managed virtual machines in a virtual machine group which will be needed to run the application.

In this hypothetical example, a user may estimate the number of managing virtual machines in a virtual machine group to be 100 (e.g. $\varphi$=100). However, in accordance with embodiments, feedback unit 32 may provide historically

TABLE 3

| Datacenter Input Context Information | Variable Symbol | Variable Name | Estimated Value | Historically Accurate Value |
|---|---|---|---|---|
| Total Managed VM Capacity Needed | $\alpha$ | Alpha | 23,300 | $\alpha_a$ = 21,800 |
| Cost per Managed VM | $\Omega$ | Omega | $200 | $\Omega_a$ = $195 |
| Number of Datacenters | $\xi$ | Xi | | |
| Offline Failure Tolerance | $\Delta$ | Delta | 1 | |
| Number of Datacenters Required to Stay Online | $\xi - \Delta$ | | | |
| Number of Managed VMs in a VM Group | $\lambda$ | Lambda | 1000 | $\lambda_a$ = 1115 |
| Number of Managing VMs in a VM Group | $\varphi$ | Phi | 100 | $\Phi_a$ = 75 |
| Cost per Managing VM | $\mu$ | Mu | $400 | $\mu_a$ = $425 |

In this hypothetical example, a user may estimate that an application needs a total of 23,300 managed virtual machines (e.g. $\alpha$=23,300). However, in accordance with embodiments, feedback unit 32 may provide historically accurate parameter $\alpha_a$ that is an actual number of managed virtual machines as 21,800 (e.g. $\alpha_a$=21,800) needed for substantially similar applications that have been historically run on datacenter network 10. In embodiments, historically accurate parameter $\alpha_a$ may be substituted and/or otherwise supplement parameter $\alpha$ at analyzer 28. In other words, in accurate parameter $\varphi_a$ that is an actual number of managing virtual machines in a virtual machine group as 75 (e.g. $\varphi_a$=75) needed for substantially similar applications that have been historically run on datacenter network 10. In embodiments, historically accurate parameter $\varphi_a$ may be substituted and/or otherwise supplement parameter $\varphi$ at analyzer 28. In other words, in embodiments, a customer's estimate of parameter $\varphi$ may be substituted with historically accurate parameters $\varphi_a$ since historically accurate parameter $\varphi_a$ better correlates the number of managing virtual machines in a virtual machine group which will be needed to run the application.

In this hypothetical example, a user may estimate the cost of each managing virtual machine to be \$400 (e.g. $\mu$=\$400). However, in accordance with embodiments, feedback unit 32 may provide historically accurate parameter $\mu_a$ that is an actual the cost of each managing virtual machine as \$425 (e.g. $\mu_a$=\$425) needed for substantially similar applications that have been historically run on datacenter network 10. In embodiments, historically accurate parameter $\mu_a$ may be substituted and/or otherwise supplement parameter $\mu$ at analyzer 28. In other words, in embodiments, a customer's estimate of parameter $\mu$ may be substituted with historically accurate parameters $\mu_a$ since historically accurate parameter $\mu_a$ better correlates the cost of each managing virtual machine which will be needed to run the application.

Figure 7:
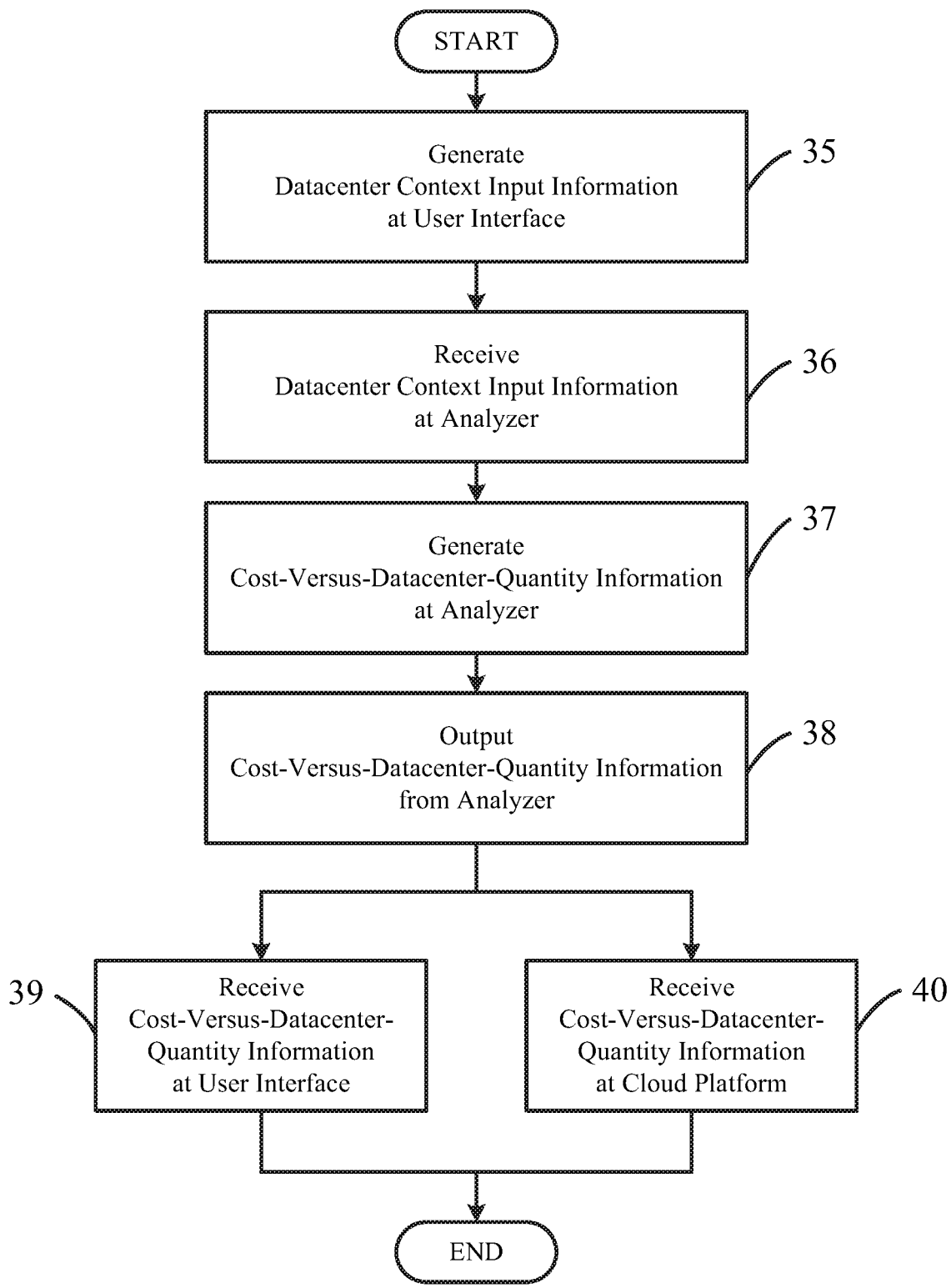
FIG. 7 illustrates an example process of generating cost-versus-datacenter-quantity information, in accordance with embodiments of the present invention.

FIG. 7 illustrates an example process of generating cost-versus-datacenter-quantity information, in accordance with embodiments of the present invention. In step 35, user interface 26 may generate datacenter context input information, in accordance with embodiments. In step 36, analyzer 28 may receive the datacenter context input information from user interface 26, in accordance with embodiments. In step 37, analyzer 28 may generate cost-versus-datacenter-quantity information, in accordance with embodiments. In step 38, analyzer 28 may output generated cost-versus-datacenter-quantity information to user interface 26 and/or a cloud management platform 34, in accordance with embodiments. In step 39, user interface 26 may receive cost-versus-datacenter-quantity information from analyzer 28, in accordance with embodiments. In step 40, cloud management platform 34 may receive the generated cost-versus-datacenter-quantity information from analyzer 28.

In embodiments, user interface 26 may generate datacenter context input information at step 35. For example, an application owner desiring to provision datacenter network 10 for the application may input provisioning parameters into a user interface using a keyboard, touchscreen, file transfer protocol, profile referencing protocol, and/or any other means appreciated by those skilled in the art to input provisioning parameters into system 25. From the customer input, user interface may generate datacenter context input information. In embodiments, datacenter context input information may include one or more of parameters $\alpha$, $\Omega$, $\lambda$, $\varphi$, and/or $\mu$ that are estimated values of datacenter components. In embodiments, datacenter context input information may include one or more confidence parameters $\alpha_a$, $\Omega_a$, $\lambda_a$, $\varphi_a$, and/or $\mu_a$ that is the customer's confidence in the associated estimated parameters $\alpha$, $\Omega$, $\lambda$, $\varphi$, and/or $\mu$. User interface 26 may output the datacenter context input information to analyzer 28 at step 36.

In embodiments, analyzer 28 may generate cost-versus-datacenter-quantity information at step 37. In embodiments, for an application, the cost for the managed virtual machines may equal $$\alpha * \Omega * \left(\frac{\xi}{\xi - \Delta}\right).$$

The parameter $\alpha$ may be the estimated, statistically deduced, or historically accurate total number of managed virtual machines anticipated to be needed to run an application. The parameter $\Omega$ may be the estimated, statistically deduced, and/or historically accurate cost of each managed virtual machine. The parameter $\Delta$ may be the risk tolerance in terms of the number of datacenters that can go offline and normal service to users is uninterrupted. The variable $\xi$ is the number of datacenters to be provisioned, which is the variable that is solved for in the determination of the cost-versus-datacenter-quantity information.

A value for $$\left(\frac{\xi}{\xi - \Delta}\right)$$

may represent the amount of overcapacity in each datacenter that is needed in the event that a $\Delta$ number of datacenters goes offline. In the local newspaper example, if three datacenters are provisioned (i.e. $\xi$=3) and one can go offline (i.e. $\Delta$=1) with service maintained, then $$\left(\frac{\xi}{\xi - \Delta}\right) = \left(\frac{3}{3-1}\right) = 1.5$$

or 150% overcapacity should be provisioned in each of the three datacenters. If $\alpha$ virtual machines are provisioned and each of the datacenters should have an overcapacity of $$\frac{\xi}{\xi - \Delta},$$

then the total number of virtual machines provisioned may be $$\alpha * \left(\frac{\xi}{\xi - \Delta}\right).$$

In the local newspaper example, if the total number of virtual machines $\alpha$ that are needed to run an application is 967 (i.e. $\alpha$=967), then $$\alpha * \left(\frac{\xi}{\xi - \Delta}\right) = 967 * \left(\frac{3}{3-1}\right) = 967 * 1.5 = 1450.5$$

managed virtual machines spread out over three datacenters. If the cost of each virtual machine $\Omega$ is \$200 (i.e. $\Omega$=\$200), then the total cost of all of the managed virtual machines is $$\alpha * \Omega * \left(\frac{\xi}{\xi - \Delta}\right) = 967 * \$200 * \left(\frac{3}{3-1}\right) = \$290,100.$$

In embodiments, for an application, the cost for the managing virtual machines may equal Ceiling $$\left(\frac{\text{Ceiling}\left(\frac{\alpha}{\xi - \Delta}, 0\right)}{\lambda}, 0\right) * \varphi * \mu * \xi.$$

A value for $$\left(\frac{\alpha}{\xi-\Delta}\right)$$

may represent the amount of managed virtual machines in each datacenter. In the local newspaper example, if there are 1000 managed virtual machines (i.e. $\alpha=967$), three datacenters (i.e. $\xi=3$), and the offline tolerance is one datacenter (i.e. $\Delta=1$), then the total number of datacenters is $$\frac{\alpha}{\xi-\Delta}=\frac{967}{3-1}=483.5.$$

Since only a discrete number of virtual machines can be provisioned, $$\frac{\alpha}{\xi-\Delta}$$

may be rounded up to the next whole number as Ceiling $$\left(\frac{\alpha}{\xi-\Delta},0\right).$$

In the local newspaper example, $$\text{Ceiling}\left(\frac{\alpha}{\xi-\Delta},0\right)=\text{Ceiling}\left(\frac{967}{3-1},0\right)=\text{Ceiling}(483.5,0)=484$$

managed virtual machines in each datacenter.

A value for $$\frac{\text{Ceiling}\left(\frac{\alpha}{\xi-\Delta},0\right)}{\lambda}$$

may represent the amount of managed virtual machines in each virtual machine group. In the local newspaper example, if there is a total number of 484 managed virtual machines in a data center (i.e.

$$\text{Ceiling}\left(\frac{\alpha}{\xi-\Delta},0\right)=484)$$

and the number of managed virtual machines in a virtual machine group is 100 (i.e. $\lambda=100$), then $$\frac{\text{Ceiling}\left(\frac{\alpha}{\xi-\Delta},0\right)}{\lambda}=\frac{\text{Ceiling}\left(\frac{967}{3-1},0\right)}{100}=4.84$$

virtual machine groups in each datacenter. Since only a discrete number of virtual machine groups can be provisioned, $$\frac{\text{Ceiling}\left(\frac{\alpha}{\xi-\Delta},0\right)}{\lambda}$$

may be rounded up to the next whole number as $$\text{Ceiling}\left(\frac{\text{Ceiling}\left(\frac{\alpha}{\xi-\Delta},0\right)}{\lambda},0\right)=$$

$$\text{Ceiling}\left(\frac{\text{Ceiling}\left(\frac{967}{3-1},0\right)}{100},0\right)=\text{Ceiling}(4.84,0)=5$$

virtual machine groups in each datacenter.

A value for $$\text{Ceiling}\left(\frac{\text{Ceiling}\left(\frac{\alpha}{\xi-\Delta},0\right)}{\lambda},0\right)*\varphi$$

may equal the number of managing virtual machine groups in each datacenter. The value $$\text{Ceiling}\left(\frac{\text{Ceiling}\left(\frac{\alpha}{\xi-\Delta},0\right)}{\lambda},0\right)$$

is the number of virtual machine groups in each datacenter. In the local newspaper example, the number of managing virtual machines in a virtual machine group may be set to 100 (i.e. $\varphi=100$). In the local newspaper example, $$\text{Ceiling}\left(\frac{\text{Ceiling}\left(\frac{\alpha}{\xi-\Delta},0\right)}{\lambda},0\right)*\varphi=$$

$$\text{Ceiling}\left(\frac{\text{Ceiling}\left(\frac{967}{3-1},0\right)}{100},0\right)*100=5*100=500$$

managing virtual machines in each datacenter.

A value for $$\text{Ceiling}\left(\frac{\text{Ceiling}\left(\frac{\alpha}{\xi-\Delta},0\right)}{\lambda},0\right)*\varphi*\mu$$

may equal the cost of the managing virtual machines in each datacenter. In the local newspaper example, $$\text{Ceiling}\left(\frac{\text{Ceiling}\left(\frac{\alpha}{\xi-\Delta},0\right)}{\lambda},0\right)*\varphi=500$$

managing virtual machines in each datacenter. If the cost for each managing virtual machine is $400 (i.e. $\mu=\$400$), then $$\text{Ceiling}\left(\frac{\text{Ceiling}\left(\frac{\alpha}{\xi-\Delta},0\right)}{\lambda},0\right)*\varphi*\mu = 5*100*\$400 = \$200,000$$

for the managing machines in each datacenter.

A value for $$\text{Ceiling}\left(\frac{\text{Ceiling}\left(\frac{\alpha}{\xi-\Delta},0\right)}{\lambda},0\right)*\varphi*\mu*\xi$$

may equal the cost of the managing virtual machines in all of the datacenters. In the local newspaper example, the cost of the managing virtual machines in each data center is $$\text{Ceiling}\left(\frac{\text{Ceiling}\left(\frac{\alpha}{\xi-\Delta},0\right)}{\lambda},0\right)*\varphi*\mu = 5*100*\$400 = \$200,000.$$

If in the local newspaper example, there are three datacenters (i.e. $\xi=3$), then $$\text{Ceiling}\left(\frac{\text{Ceiling}\left(\frac{\alpha}{\xi-\Delta},0\right)}{\lambda},0\right)*\varphi*\mu*\xi = 5*100*\$400*3 = \$600,000$$

for all of the managing virtual machines running the application over all of the datacenters.

A value for $$\alpha*\Omega*\left(\frac{\xi}{\xi-\Delta}\right)+\text{Ceiling}\left(\frac{\text{Ceiling}\left(\frac{\alpha}{\xi-\Delta},0\right)}{\lambda},0\right)*\varphi*\mu*\xi$$

may represent the total cost of managing and managed virtual machines run on a datacenter network 10 for an application, in accordance with embodiments. In the local newspaper example, $$\alpha*\Omega*\left(\frac{\xi}{\xi-\Delta}\right)+\text{Ceiling}\left(\frac{\text{Ceiling}\left(\frac{\alpha}{\xi-\Delta},0\right)}{\lambda},0\right)*\varphi*\mu*\xi =$$

$$967*\$200*\left(\frac{3}{3-1}\right)+\text{Ceiling}\left(\frac{\text{Ceiling}\left(\frac{967}{3-1},0\right)}{100},0\right)*100*\$400*3 =$$

$$\$290,100+\$600,000 = \$890,100$$

for the total cost of managing and managed virtual machines to run the application.

In embodiments, in step 37, analyzer 28 may calculate the total cost of managing and managed virtual machines to run an application for different numbers of datacenters. In embodiments, there may be an optimal number of datacenters from a cost perspective that is represented in cost-versus-datacenter-quantity information. In other words, there may be an optimal number of datacenters $\xi$ having the lowest cost when the datacenter context input information (e.g. $\alpha$, $\Omega$, $\lambda$, $\varphi$, and/or $\mu$) is satisfied. In embodiments, datacenter context input information may be any combination of estimated parameters (e.g. $\alpha$, $\Omega$, $\lambda$, $\varphi$, and/or $\mu$), confidence factored parameters (e.g. $<\alpha_{cf}>$, $<\Omega_{cf}>$, $<\lambda_{cf}>$, $<\varphi_{cf}>$, and/or $<\mu_{cf}>$), and/or historically accurate parameters (e.g. $\alpha_a$, $\Omega_a$, $\lambda_a$, $\varphi_a$, and/or $\mu_a$).

For example, in the hypothetical graph of FIG. 5, hypothetical cost-versus-datacenter-quantity information 24a shows an inflection trough point for the optimized cost between 24 (twenty-four) and 25 (twenty-five) datacenters when there are 23,300 managed virtual machines. Likewise, hypothetical cost-versus-datacenter-quantity information 24b shows an inflection trough point between 14 (fourteen) and 15 (fifteen) datacenters when there are 14,400 managed virtual machines. As yet another hypothetical example, hypothetical cost-versus-datacenter-quantity information 24c shows an inflection trough point between 8 (eight) and 9 (nine) datacenters when there are 8,900 managed virtual machines. In each of these three sets of hypothetical cost-versus-datacenter-quantity information 24a, 24b, and 24c, for the purposes of example, these hypotheticals presumed that the cost of each managed virtual machine is estimated at $200 (i.e. $\Omega$ or $<\Omega_{cf}>$ or $\Omega_a=\$200$), the cost of each managing virtual machine is estimated at $400 (i.e. $\mu$ or $<\mu_{cf}>$ or $\mu_a=\$400$), the number of managed virtual machines in a virtual machine group is 1000 (i.e. $\lambda$ or $<\lambda_{cf}>$ or $\lambda_a=1000$), and the number of managing virtual machines in a virtual machine group is 100 (i.e. $\Phi$ or $<\Phi_{cf}>$ or $\Phi_a=100$).

Since estimates (e.g. $\alpha$, $\Omega$, $\lambda$, $\varphi$, and/or $\mu$) provided by users at user interface 26 may be modified, substituted, statistically compensated, or otherwise modified, the optimal number of datacenters $\xi$ to run an application may vary based on a plurality of unpredictable variables. In embodiments, an object of an algorithm that determines the least costly number of datacenters within user defined confidence factors (e.g. $\alpha_{cf}$, $\Omega_{cf}$, $\lambda_{cf}$, $\varphi_{cf}$, and/or $\mu_{cf}$) and/or using feedback of actual costs from a database (e.g. $\alpha_a$, $\Omega_a$, $\lambda_a$, $\varphi_a$, and/or $\mu_a$). Since embodiments may be applicable to applications requiring a relatively large number of virtual machines with a relatively large number of datacenters, computer aided analysis is necessary to make consistently accurate cost predictions and/or cost minimization determinations.

In embodiments, analyzer 28 may output generated cost-versus-datacenter-quantity information to user interface 26 and/or a cloud management platform 34 at step 38. In embodiments, analyzer 28 may output generated cost-versus-datacenter-quantity information to user interface 26. Step 39 may receive cost-versus-datacenter-quantity information at user interface 26. An output to a customer at user interface 26 may take any form appreciated by those skilled in the art. In embodiments, cost-versus-datacenter-quantity information may output and/or display a graph of total cost to the number of datacenters (e.g. the hypothetical graph of example FIG. 5). Output of cost-versus-datacenter-quantity information to a customer may prompt a customer to modify estimates (e.g. $\alpha$, $\Omega$, $\lambda$, $\varphi$, and/or $\mu$) and/or confidence factor parameters (e.g. $\alpha_{cf}$, $\Omega_{cf}$, $\lambda_{cf}$, $\varphi_{cf}$, and/or $\mu_{cf}$) to assist in a business decision making process of how to provision components of a datacenter to run an application.

In embodiments, analyzer 28 may output generated cost-versus-datacenter-quantity information to cloud management platform 34. Step 40 may receive cost-versus-datacenter-quantity information at cloud management platform 34. In embodiments, cost-versus-datacenter-quantity information may communicated to a plurality of automated systems separately and/or in conjunction with the cost-versus-datacenter-quantity information being received at user interface 26. In embodiments, output of cost-versus-datacenter-quantity information to cloud management platform 34 may be performed in conjunction with feedback unit 32 to provide historically accurate parameters (e.g. $\alpha_a$, $\Omega_a$, $\lambda_a$, $\varphi_a$, and/or $\mu_a$) from feedback unit 32 to analyzer 28 that can substitute and/or otherwise supplement for user defined estimates (e.g. $\alpha$, $\Omega$, $\lambda$, $\varphi$, and/or $\mu$). In embodiments, cloud management platform 34 and/or feedback unit 32 may assist in a business decision making process of how to provision components of a datacenter to run an application.

Figure 8:
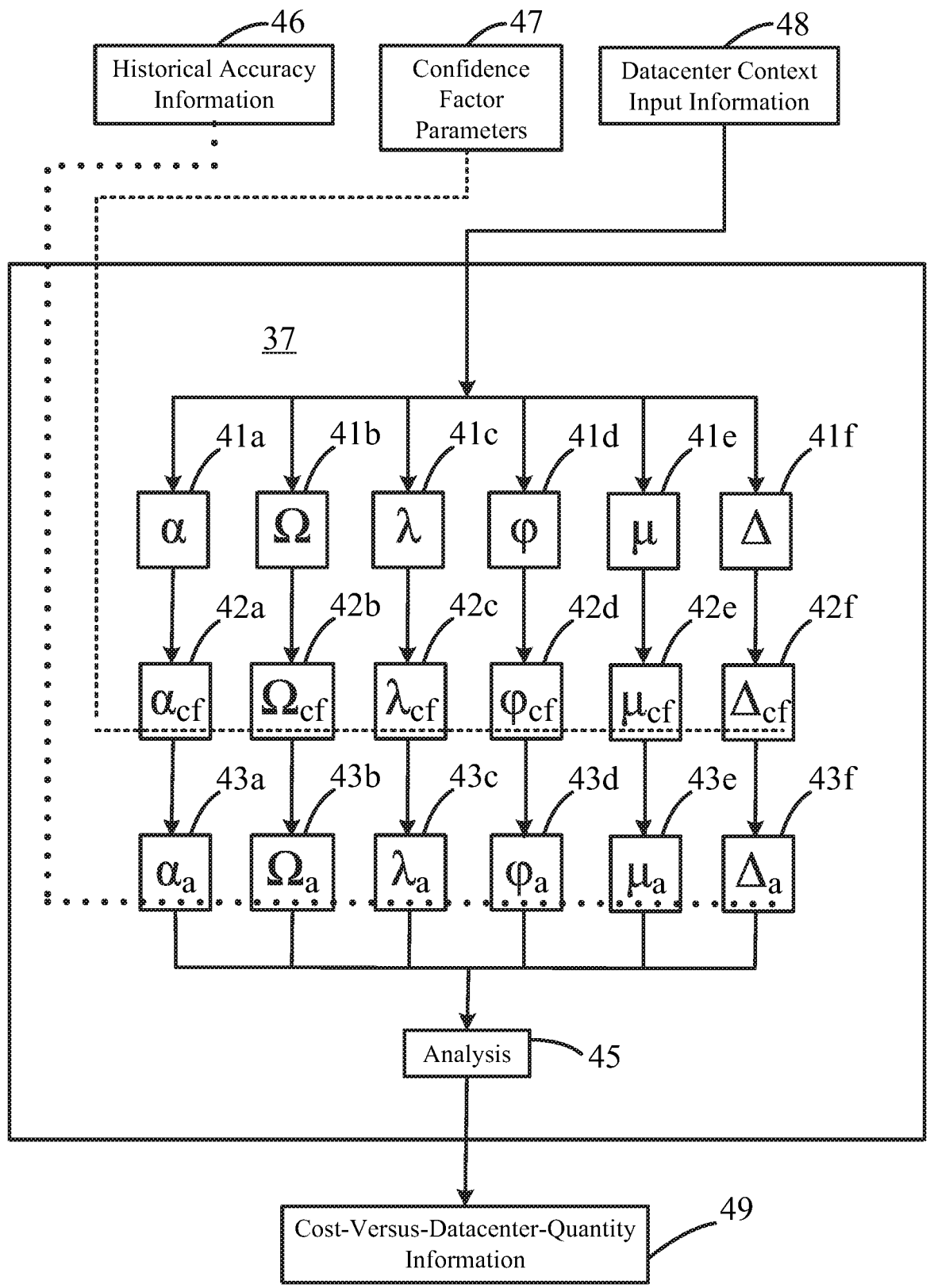
FIG. 8 illustrates an example process of generating cost-versus-datacenter-quantity information using historical accuracy information and/or confidence factor parameters, in accordance with embodiments of the present invention.

FIG. 8 illustrates an example process of generating cost-versus-datacenter-quantity information using historical accuracy information and/or confidence factor parameters, in accordance with embodiments of the present invention. In step 37 of generating cost-versus-datacenter-quantity information, substeps 41a-41f may directly or indirectly process datacenter context input information 48 input from user interface 26 and/or otherwise received. For example, in embodiments, datacenter context input information 48 processing during step 37 may be processed in user input processing substeps 41a-41f (e.g. α41a, $\Omega$ 41b, $\lambda$ 41c, $\varphi$ 41d, and/or $\mu$ 41f).

In embodiments, in addition to datacenter context input information 48, confidence factor parameters 47 (e.g. $\alpha_{cf}$, $\Omega_{cf}$, $\lambda_{cf}$, $\varphi_{cf}$, and/or $\mu_{cf}$) may also be processed in confidence factoring substeps 42a-42f (e.g. $\alpha_{cf}$ 42a, $\Omega_{cf}$ 42b, $\lambda_{cf}$ 42c, $\varphi_{cf}$ 42d, and/or $\mu_a$ 42f). Confidence factoring substeps may be perform by analyzer 28 in conjunction with simulator 30 and/or any other source of resources, in accordance with embodiments. In embodiments, confidence factoring substeps 42a-42f may replace, supplement, and/or otherwise modify datacenter context input information 48 (e.g. $\alpha$, $\Omega$, $\lambda$, $\varphi$, and/or $\mu$) with values (e.g. $<\alpha_{cf}>$, $<\Omega_{cf}>$, $<\lambda_{cf}>$, $<\varphi_{cf}>$, and/or $<\mu_{cf}>$) that are statistical simulations (e.g. Monte Carlo simulations) based on the datacenter context input information 48 and the confidence factor parameters 47.

In embodiments, in addition to datacenter context input information 48 and/or confidence factor parameters 47, historically accurate parameters (e.g. $\alpha_a$, $\Omega_a$, $\lambda_a$, $\varphi_a$, and/or $\mu_a$) may also be processed in historical accuracy substeps 42a-42f (e.g. $\alpha_a$ 43a, $\Omega_a$ 43b, $\lambda_a$ 43c, $\varphi_a$ 43d, and/or $\mu_a$ 43f). Historical accuracy substeps 42a-42f may be perform by analyzer 28 in conjunction with feedback unit 32 and/or any other source of resources, in accordance with embodiments. In embodiments, historical accuracy substeps 42a-42f may replace, supplement, and/or otherwise modify datacenter context input information 48 (e.g. $\alpha$, $\Omega$, $\lambda$, $\varphi$, and/or $\mu$) and/or statistically simulated values (e.g. $<\alpha_{cf}>$, $<\Omega_{cf}>$, $<\lambda_{cf}>$, $<\varphi_{cf}>$, and/or $<\mu_{cf}>$) with historically accurate parameters (e.g. $\alpha_a$, $\Omega_a$, $\lambda_a$, $\varphi_a$, and/or $\mu_a$). In embodiments, any applicable historically accurate parameters would take priority over any statistically simulated values (e.g. $<\alpha_{cf}>$, $<\Omega_{cf}>$, $<\lambda_{cf}>$, $<\varphi_{cf}>$, and/or $<\mu_{cf}>$).

In a hypothetical local newspaper example, datacenter context input information may include estimated values for the total number of virtual machines $\alpha$ that are needed to run an application as 967 (i.e. $\alpha$=967), that the cost of each virtual machine $\Omega$ is $200 (i.e. $\Omega$=$200), and that the number of managed virtual machines in a virtual machine group is 1000 (i.e. $\lambda$=1000). In the hypothetical, confidence factor parameters 47 are 80% for the $\alpha$ parameter (i.e. $\alpha_{cf}$=80%), 80% for the $\Omega$ parameter (i.e. $\Omega_{cf}$=80%), and 100% for the $\lambda$ parameter (i.e. $\lambda_{cf}$=100%). Since confidence parameter $\lambda_{cf}$=100%, substep 41c may pass the value $\lambda$ from datacenter context input information 48 to substep 43c. In the hypothetical, historical accuracy information 46 may indicate that the actual price of each managed virtual machine is $195 (i.e. $\Omega$=$195), with no values for historically accurate parameters $\alpha_a$ or $\lambda_a$. Since there are no values for historically accurate parameters $\alpha_a$ or $\lambda_a$, substeps 43a and 43c pass without modifying the parameters received from substeps 42a and 42c to analysis step 45. Analysis step 45 may output cost-versus-datacent-quantity information, which may be used to determine the most cost effective number of datacenters to be used to run an application. One of ordinary skill in the art would appreciate other ways to process datacenter context input information 48, confidence factor parameters 47, and/or historical accuracy information 46 and therefore embodiments described are non-limiting and for exemplary explanation purposes.

Figure 9:
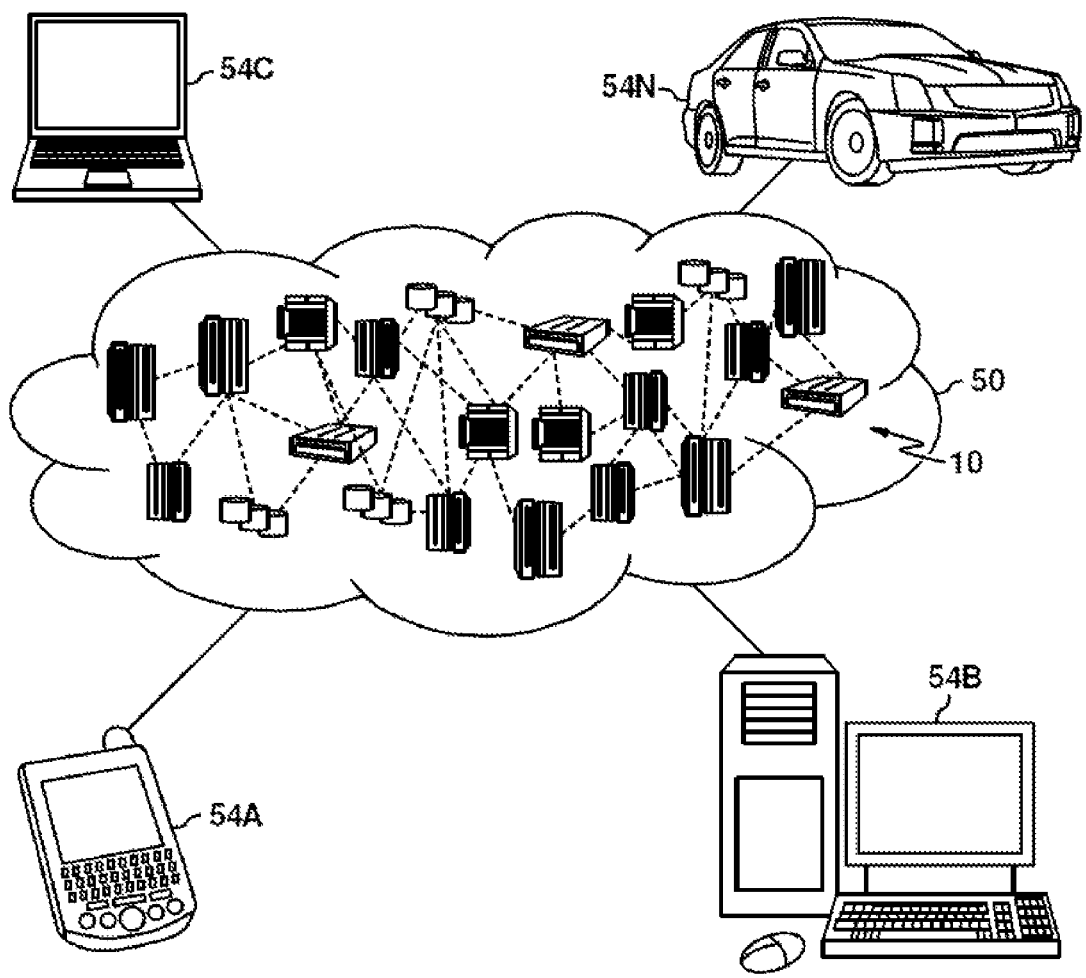
FIG. 9 depicts a cloud computing environment according to embodiments of the present invention.

FIG. 9 depicts a cloud computing environment according to embodiments of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
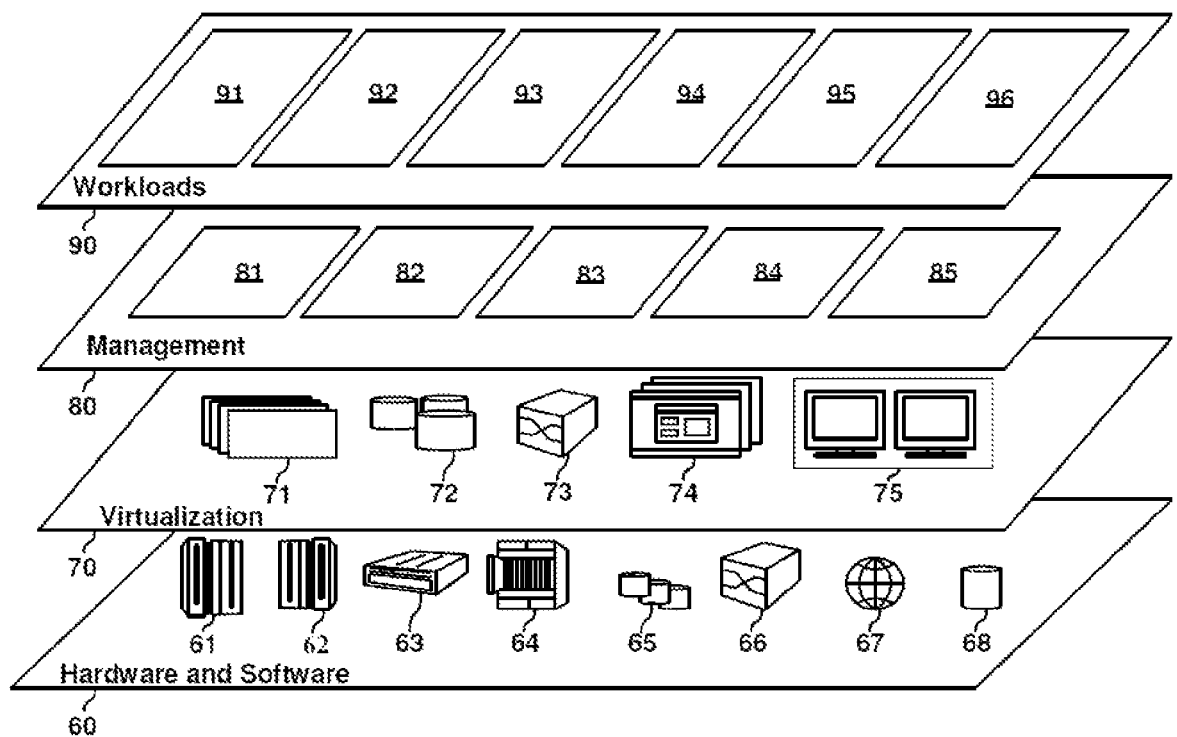
FIG. 10 depicts abstraction model layers according to embodiments of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determining the most cost effective number of datacenters to run an application 96. Processing datacenter context input information to generate cost-versus-datacenter-quantity information.

Figure 11:
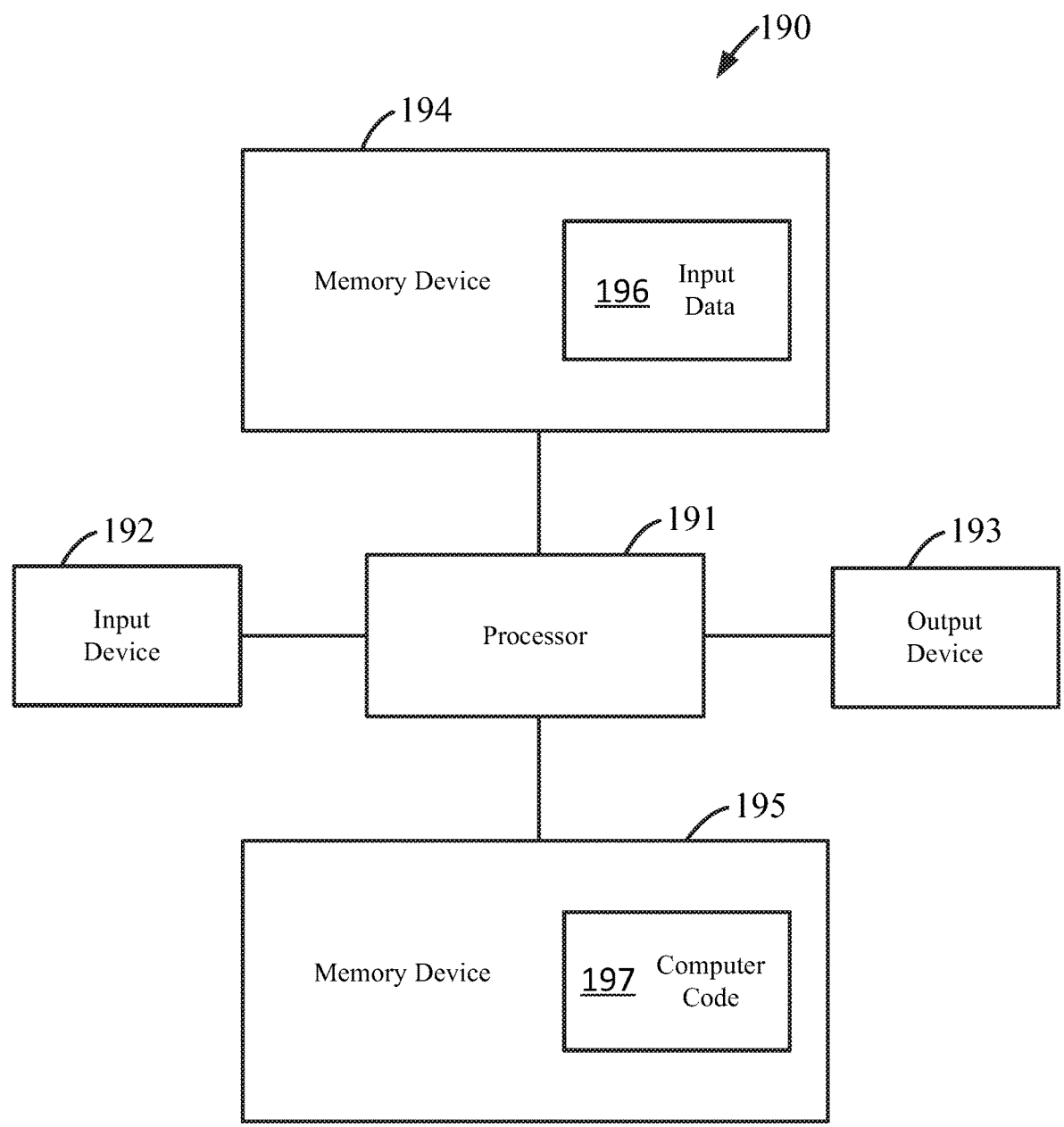
FIG. 11 illustrates a computer system used for implementing the methods associated with embodiments of the present invention.

FIG. 11 illustrates a computer system 190 used for implementing the methods of the present invention. The computer system 190 includes a processor 191, an input device 192 coupled to the processor 191, an output device 193 coupled to the processor 191, and memory devices 194 and 195 each coupled to the processor 191. The input device 192 may be, inter alia, a keyboard, a mouse, etc. The output device 193 may be, inter alia, a printer, a plotter, a computer screen, a magnetic tape, a removable hard disk, a floppy disk, etc. The memory devices 194 and 195 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 195 includes a computer code 197 which is a computer program that includes computer-executable instructions. The computer code 197 includes software or program instructions that may implement an algorithm for implementing methods of embodiments of the present invention. The processor 191 executes the computer code 197. The memory device 194 includes input data 196. The input data 196 includes input required by the computer code 197. The output device 193 displays output from the computer code 197. Either or both memory devices 194 and 195 (or one or more additional memory devices not shown in FIG. 11) may be used as a computer usable storage medium (or program storage device) having a computer readable program embodied therein and/or having other data stored therein, wherein the computer readable program includes the computer code 197. Generally, a computer program product (or, alternatively, an article of manufacture) of the computer system 190 may include the computer usable storage medium (or said program storage device).

The processor 191 may represent one or more processors. The memory device 194 and/or the memory device 195 may represent one or more computer readable hardware storage devices and/or one or more memories.

Thus embodiments of the present invention discloses a process for supporting, deploying and/or integrating computer infrastructure, integrating, hosting, maintaining, and deploying computer-readable code into the computer system 190, wherein the code in combination with the computer system 190 is capable of implementing the methods of embodiments of the present invention.

While FIG. 11 shows the computer system 190 as a particular configuration of hardware and software, any configuration of hardware and software, as would be known to a person of ordinary skill in the art, may be utilized for the purposes stated supra in conjunction with the particular computer system 190 of FIG. 11. For example, the memory devices 194 and 195 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of embodiments may include one or more computer readable hardware storage devices having computer readable program code stored therein, said program code containing instructions executable by one or more processors of a computing system (or computer system) to implement the methods of the present invention.

A computing system (or computer system) of embodiments may include one or more processors, one or more memories, and one or more computer readable hardware storage devices, said one or more hardware storage devices containing program code executable by the one or more processors via the one or more memories to implement the methods of embodiments.

In embodiments, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

In embodiments, the determining potential sources of damage may be implemented using special purpose algorithms. For example, a special purpose algorithm may be implemented to compare attributes of damage to the object and historically damaged objects. Similar damage between the object and historically damaged objects may identify patterns of the circumstances of the object and the historically damaged objects, which through the special purpose algorithm allow a potential source of damage based on industry specific circumstances. In embodiments, a special purpose algorithm analyzing scratches, tears, cracks, indentations, missing components, discoloration, travel paths, brands of objects, models of objects, personal handling objects, weight attributes of objects, circumstantial weather attributes of objects, utilities of objects, seasonal attributes of objects, and/or any other industry specific attributes that would be obvious to one of ordinary skill in the art.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, said method comprising:

receiving, by one or more processors of a computer system of a plurality of data centers from a feedback unit of the computer system, latest values of historically accurate parameters, wherein the historically accurate parameters comprise:

$\alpha_a$ representing a historically accurate total quantity of managed virtual machines used to run one or more historical applications similar to an application;

$\Omega_a$ representing a historically accurate cost of each of the managed virtual machines used to run the one or more historical applications similar to the application;

$\lambda_a$ representing a historically accurate number of managed virtual machines that are managed by a virtual machine managing group used to run the one or more of historical applications similar to the application;

$\varphi_a$ representing a historically accurate number of managing virtual machines in the virtual machine managing group used to run the one or more of historical applications similar to the application;

$\mu_a$ representing a historically accurate cost of each managing virtual machine used to run the one or more of historical applications similar to the application;

processing, by the one or more processors, the historically accurate parameters, a parameter $\xi$, and a parameter $\Delta$ to generate cost-versus-datacenter-quantity information, wherein the cost-versus-datacenter-quantity information is a total datacenter cost to run the application versus $\xi$, wherein $\xi$ represents a quantity of datacenters used to run the application, wherein $\Delta$ represents a number of data centers that can fail while 100% capacity of expected user demand to run the application is satisfied, and wherein $\Delta<\xi$ and $\Delta$ is at least 1;

outputting, by the one or more processors, the cost-versus-datacenter-quantity information;

identifying, by the one or more processors from a monitoring of the data centers, a change in one or more values of the historically accurate parameters;

in response to said identifying the change in the one or more values of the historically accurate parameters, iteratively repeating, by the one or more processors, said receiving, said processing, and said outputting, wherein said iteratively repeating progressively reduces confidence factors and associated calculated overcapacities by updating the confidence factors in successive iterations; and in each successive iteration during said iteratively repeating, changing in response to the progressively reduced confidence factors: a total number of managed virtual machines used to run the application, a number of managed virtual machines in each virtual machine managing group used to run the application, a number of managing virtual machines in each virtual machine managing group used to run the application, or combinations thereof.

2. The method of claim 1, wherein said processing the historically, accurate parameters, the parameter $\xi$, and the parameter $\Delta$ comprises:

calculating a cost of the managed virtual machines to equal $$\alpha * \Omega * \left(\frac{\xi}{\xi - \Delta}\right),$$

calculating a cost of the managing virtual machines to equal $$\text{Ceiling}\left(\frac{\text{Ceiling}\left(\frac{\alpha}{\xi - \Delta}, 0\right)}{\lambda}, 0\right) * \varphi * \mu * \xi,$$

and calculating a total cost of the managed virtual machines and the managing virtual machines to equal $$\alpha * \Omega * \left(\frac{\xi}{\xi - \Delta}\right) + \text{Ceiling}\left(\frac{\text{Ceiling}\left(\frac{\alpha}{\xi - \Delta}, 0\right)}{\lambda}, 0\right) * \varphi * \mu * \xi,$$

wherein $\alpha$, $\Omega$, $\lambda$, $\varphi$, and $\mu$ are context parameters, and wherein $\alpha = \alpha_a$, $\Omega = \Omega_a$, $\lambda = \lambda_a$, $\varphi = \varphi_a$, and $\mu = \mu_a$ in said calculating the cost of the managed virtual machines, said calculating the cost of the managing virtual machines, and said calculating the total cost.

3. The method of claim 2, wherein:

a most cost effective number of datacenters to be used for the application comprises a value of the parameter $\xi$ that represents the most cost effective number of datacenters to be used to run the application; and the most cost effective number of datacenters is determined from said calculating the total cost of the managed virtual machines and the managing virtual machines.

4. The method of claim 1, wherein the feedback unit comprises an interface for non-human data feeds to a cloud management platform.

5. A computer system comprising: one or more processors; a memory coupled to the one or more processors; and a computer readable storage device coupled to the one or more processors, said storage device containing instructions that are executed by the one or more processors via the memory to implement a method, said method comprising:

receiving, by the one or more processors of the computer system of a plurality of data centers from a feedback unit of the computer system, latest values of historically accurate parameters, wherein the historically accurate parameters comprise:

$\alpha_a$ representing a historically accurate total quantity of managed virtual machines used to run one or more historical applications similar to an application;

$\Omega_a$ representing a historically accurate cost of each of the managed virtual machines used to run the one or more historical applications similar to the application;

$\lambda_a$ representing a historically accurate number of managed virtual machines that are managed by a virtual machine managing group used to run the one or more of historical applications similar to the application;

$\varphi_a$ representing a historically accurate number of managing virtual machines in the virtual machine managing group used to run the one or more of historical applications similar to the application;

$\mu_a$ representing a historically accurate cost of each managing virtual machine used to run the one or more of historical applications similar to the application;

processing, by the one or more processors, the historically accurate parameters, a parameter $\xi$, and a parameter $\Delta$ to generate cost-versus-datacenter-quantity information, wherein the cost-versus-datacenter-quantity information is a total datacenter cost to run the application versus $\xi$, wherein $\xi$ represents a quantity of datacenters used to run the application, wherein $\Delta$ represents a number of data centers that can fail while 100% capacity of expected user demand to run the application is satisfied, and wherein $\Delta<\xi$ and $\Delta$ is at least 1;

outputting, by the one or more processors, the cost-versus-datacenter-quantity information;

identifying, by the one or more processors from a monitoring of the data centers, a change in one or more values of the historically accurate parameters;

in response to said identifying the change in the one or more values of the historically accurate parameters, iteratively repeating, by the one or more processors, said receiving, said processing, and said outputting, wherein said iteratively repeating progressively reduces confidence factors and associated calculated overcapacities by updating the confidence factors in successive iterations; and in each successive iteration during said iteratively repeating, changing in response to the progressively reduced confidence factors: a total number of managed virtual machines used to run the application, a number of managed virtual machines in each virtual machine managing group used to run the application, a number of managing virtual machines in each virtual machine managing group used to run the application, or combinations thereof.

6. The computer system of claim 5, wherein said processing the historically accurate parameters, the parameter ξ, and the parameter Δ comprises:

calculating a cost of the managed virtual machines to equal $$\alpha * \Omega * \left(\frac{\xi}{\xi - \Delta}\right),$$

calculating a cost of the managing virtual machines to equal $$\text{Ceiling}\left(\frac{\text{Ceiling}\left(\frac{\alpha}{\xi - \Delta}, 0\right)}{\lambda}, 0\right) * \varphi * \mu * \xi,$$

and calculating a total cost of the managed virtual machines and the managing virtual machines to equal $$\alpha * \Omega * \left(\frac{\xi}{\xi - \Delta}\right) + \text{Ceiling}\left(\frac{\text{Ceiling}\left(\frac{\alpha}{\xi - \Delta}, 0\right)}{\lambda}, 0\right) * \varphi * \mu * \xi,$$

wherein α, Ω, λ, φ, and μ are context parameters, and wherein α=$\alpha_a$, Ω=$\Omega_a$, λ=$\lambda_a$, φ=$\varphi_a$, and μ=$\mu_a$ in said calculating the cost of the managed virtual machines, said calculating the cost of the managing virtual machines, and said calculating the total cost.

7. A computer program product, comprising a computer readable hardware storage device having computer readable program code stored therein, said hardware storage device not being a transitory signal, said program code containing instructions executable by one or more processors of a computer system to implement a method, said method comprising:

receiving datacenter context input information;

receiving, by the one or more processors of the computer system of a plurality of data centers from a feedback unit of the computer system, latest values of historically accurate parameters, wherein the historically accurate parameters comprise:

$\alpha_a$ representing a historically accurate total quantity of managed virtual machines used to run one or more historical applications similar to an application;

$\Omega_a$ representing a historically accurate cost of each of the managed virtual machines used to run the one or more historical applications similar to the application;

$\lambda_a$ representing a historically accurate number of managed virtual machines that are managed by a virtual machine managing group used to run the one or more of historical applications similar to the application;

$\varphi_a$ representing a historically accurate number of managing virtual machines in the virtual machine managing group used to run the one or more of historical applications similar to the application;

$\mu_a$ representing a historically accurate cost of each managing virtual machine used to run the one or more of historical applications similar to the application;

processing, by the one or more processors, the historically accurate parameters, a parameter ξ, and a parameter Δ to generate cost-versus-datacenter-quantity information, wherein the cost-versus-datacenter-quantity information is a total datacenter cost to run the application versus ξ, wherein ξ represents a quantity of datacenters used to run the application, wherein Δ represents a number of data centers that can fail while 100% capacity of expected user demand to run the application is satisfied, and wherein Δ<ξ and Δ is at least 1;

outputting, by the one or more processors, the cost-versus-datacenter-quantity information;

identifying, by the one or more processors from a monitoring of the data centers, a change in one or more values of the historically accurate parameters;

in response to said identifying the change in the one or more values of the historically accurate parameters, iteratively repeating, by the one or more processors, said receiving, said processing, and said outputting, wherein said iteratively repeating progressively reduces confidence factors and associated calculated overcapacities by updating the confidence factors in successive iterations; and in each successive iteration during said iteratively repeating, changing in response to the progressively reduced confidence factors: a total number of managed virtual machines used to run the application, a number of managed virtual machines in each virtual machine managing group used to run the application, a number of managing virtual machines in each virtual machine managing group used to run the application, or combinations thereof.

8. The computer program product of claim 7, wherein said processing the historically accurate parameters, the parameter ξ, and the parameter Δ comprises:

calculating a cost of the managed virtual machines to equal $$\alpha * \Omega * \left(\frac{\xi}{\xi - \Delta}\right),$$

calculating a cost of the managing virtual machines to equal $$\text{Ceiling}\left(\frac{\text{Ceiling}\left(\frac{\alpha}{\xi - \Delta}, 0\right)}{\lambda}, 0\right) * \varphi * \mu * \xi,$$

and calculating a total cost of the managed virtual machines and the managing virtual machines to equal $$\alpha * \Omega * \left(\frac{\xi}{\xi - \Delta}\right) + \text{Ceiling}\left(\frac{\text{Ceiling}\left(\frac{\alpha}{\xi - \Delta}, 0\right)}{\lambda}, 0\right) * \varphi * \mu * \xi,$$

wherein $\alpha$, $\Omega$, $\lambda$, $\varphi$, and $\mu$ are context parameters, and wherein $\alpha=\alpha_a$, $\Omega=\Omega_a$, $\lambda=\lambda_a$, $\varphi=\varphi_a$, and $\mu=\mu_a$ in said calculating the cost of the managed virtual machines, said calculating the cost of the managing virtual machines, and said calculating the total cost.

* * * * *